(12) United States Patent
Kim et al.

(10) Patent No.: US 9,971,748 B2
(45) Date of Patent: May 15, 2018

(54) METHOD AND APPARATUS FOR OUTPUTTING DIGITAL CONTENT

(71) Applicant: Samsung Electronics Co., Ltd., Gyeonggi-do (KR)

(72) Inventors: Kyung-Tae Kim, Gyeonggi-do (KR); Yang-Wook Kim, Gyeonggi-do (KR); Hye-Rim Bae, Gyeonggi-do (KR); Sun-Key Lee, Gyeonggi-do (KR); Chang-Hyup Jwa, Jeju-si (KR); Doo-Suk Kang, Gyeonggi-do (KR); Chang-Ho Lee, Gyeonggi-do (KR); Sae-Mee Yim, Gyeonggi-do (KR); Yong-Joon Jeon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 175 days.

(21) Appl. No.: 14/573,239

(22) Filed: Dec. 17, 2014

(65) Prior Publication Data
US 2015/0178253 A1    Jun. 25, 2015

(30) Foreign Application Priority Data

Dec. 20, 2013    (KR) .......................... 10-2013-0160396

(51) Int. Cl.
*G06F 17/21*    (2006.01)
*G06F 17/22*    (2006.01)

(52) U.S. Cl.
CPC ........ *G06F 17/2247* (2013.01); *G06F 17/212* (2013.01)

(58) Field of Classification Search
CPC ........... G06F 17/30905; G06F 17/2247; G06F 17/30896; G06F 17/211; G06F 17/2745; G06F 17/30899; G06F 17/212
See application file for complete search history.

(56) References Cited

U.S. PATENT DOCUMENTS 6,812,941 B1 * 11/2004 Brown .............. G06F 17/30905
                                                            707/E17.121
8,086,957 B2    12/2011 Bauchot et al.
(Continued)

FOREIGN PATENT DOCUMENTS

KR    10-2008-0016427 A    2/2008
KR    10-2011-0009675 A    1/2011
(Continued)

OTHER PUBLICATIONS

Bickmore, et al.; "Digestor: device-independent access to the World Wide Web"; Computer Networks and ISDN Systems; vol. 29; 1997, 1075-1082; Elsevier Science B.V.
(Continued)

*Primary Examiner* — Wilson Tsui
(74) *Attorney, Agent, or Firm* — Cha & Reiter, LLC

(57) ABSTRACT

A method is provided comprising: retrieving a markup language file associated with a document, the markup language file including an identifier for retrieving a content item that is part of the document; parsing the markup language file into a first plurality of objects, the first plurality of objects including a first object associated with the content item; assigning a respective layout level to each one of the first plurality of objects; and outputting the document in accordance with a first layout level by: (i) retrieving the content item from a remote source in response to the layout level of the first object matching the first layout level, and (ii) rendering one or more objects from the first plurality based the one or more objects' respective layout levels matching the first layout level.

18 Claims, 21 Drawing Sheets

(56) References Cited

U.S. PATENT DOCUMENTS

| | | | |
|---|---|---|---|
| 8,244,832 B1* | 8/2012 | McGuire | H04W 4/20 455/12.1 |
| 2001/0054049 A1* | 12/2001 | Maeda | G06F 17/30905 715/236 |
| 2002/0016801 A1* | 2/2002 | Reiley | G06F 17/30905 715/236 |
| 2004/0100509 A1 | 5/2004 | Sommerer et al. | |
| 2006/0036955 A1 | 2/2006 | Baudisch et al. | |
| 2008/0301545 A1* | 12/2008 | Zhang | G06F 17/212 715/235 |
| 2009/0013034 A1* | 1/2009 | Cheng | H04L 67/02 709/203 |
| 2009/0070413 A1 | 3/2009 | Priyadarshan et al. | |
| 2010/0146378 A1* | 6/2010 | Bank | G06F 17/3089 715/234 |
| 2010/0281400 A1 | 11/2010 | Forutanpour et al. | |
| 2011/0119571 A1 | 5/2011 | Decker et al. | |
| 2011/0209046 A1* | 8/2011 | Huang | G06F 17/30905 715/234 |
| 2012/0144288 A1* | 6/2012 | Caruso | G06F 17/30905 715/234 |
| 2012/0159311 A1 | 6/2012 | Hanssen et al. | |
| 2012/0288012 A1* | 11/2012 | Staikos | G06F 9/5038 375/240.25 |

FOREIGN PATENT DOCUMENTS

| | | |
|---|---|---|
| KR | 10-2012-0024700 A | 3/2012 |
| KR | 10-2012-0028421 A | 3/2012 |
| KR | 10-2012-0067203 A | 6/2012 |
| KR | 10-2012-0139955 A | 12/2012 |

OTHER PUBLICATIONS

European Search Report dated Aug. 3, 2017.

* cited by examiner

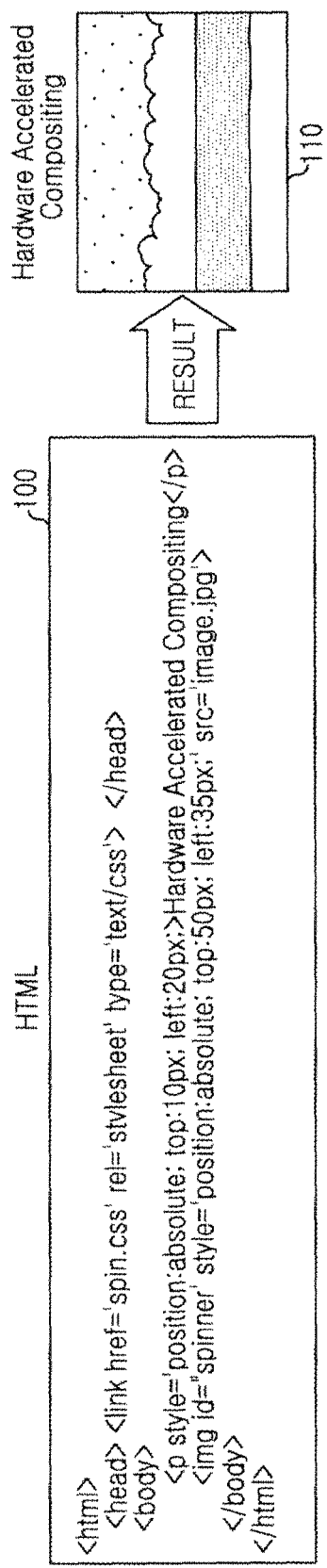
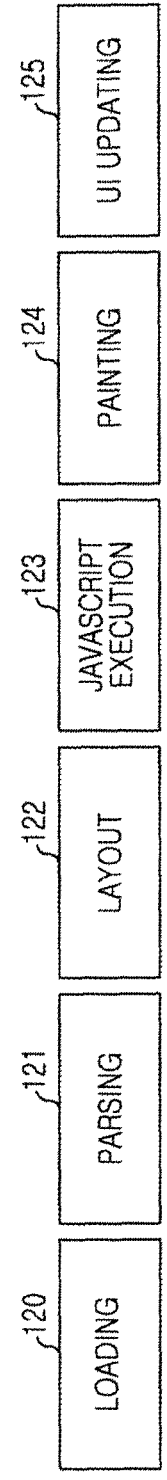
FIG.1A
FIG.1B

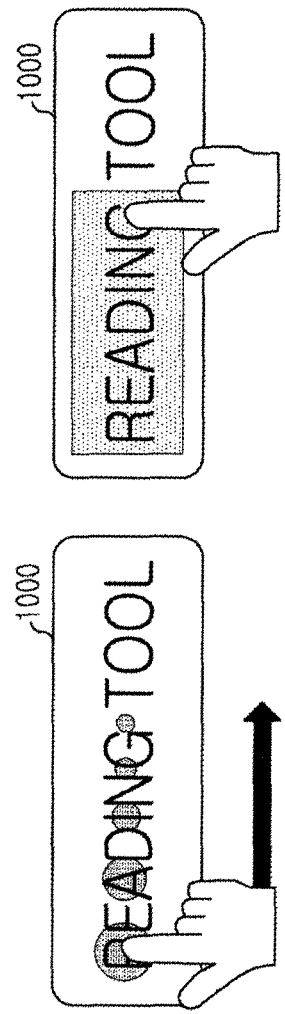
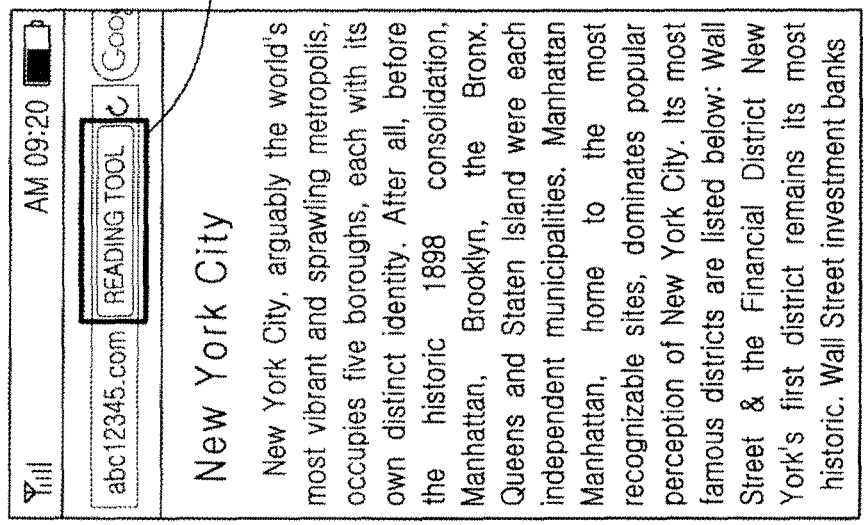
FIG. 10A
FIG. 10B
FIG. 10C

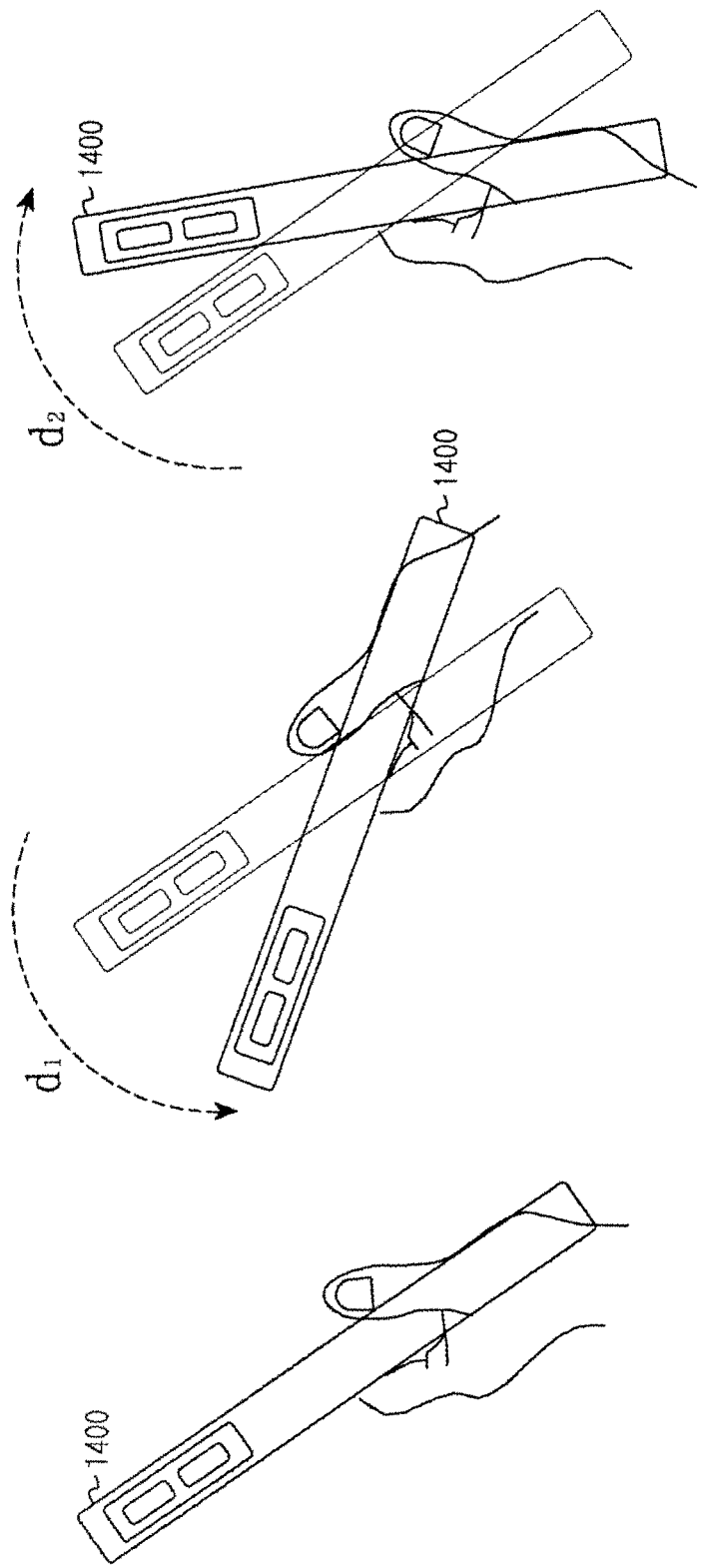

METHOD AND APPARATUS FOR OUTPUTTING DIGITAL CONTENT

CLAIM OF PRIORITY

This application claims priority under 35 U.S.C. § 119 to an application filed in the Korean Intellectual Property Office on Dec. 20, 2013 and assigned Serial No. 10-2013-0160396, the contents of which are incorporated herein by reference.

BACKGROUND

1. Field of the Disclosure

The present disclosure generally relates to electronic devices and more particularly to a method and apparatus for outputting digital content.

2. Description of the Related Art

With the development of hardware and software, a web designer may create various and complex web pages and a user may search and display the various and complex web pages through a graphical user interface (GUI) of a web browser. For example, a web designer may create various and complex web pages of contents interactive function/interface by using mark-up language such as HyperText Markup Language (HTML)/Extensible Hypertext Markup Language (XHTML)/eXtensible Markup Language (XML) and scripting language such as Javascript, Actionscript, Code Fusion, Active Server Page (ASP), Java server page (JSP), Per, Personal Hypertext Preprocessor (PHP), and Python. For example, components such as a text, a bitmap picture (for example, GIF, JPEG, and PNG), and a form may be disposed on a page using an HTML/XHTML/XML tag. When complex media such as vector graphics, animation, video and sound are displayed, an additional plug-in such as Flash, QuickTime, and Java runtime environment may be required. A plug-in may be added to a webpage by using an HTML/XHTML tag.

Through such a webpage, variety of digital contents may be graphically provided to a user.

As mentioned above, when complex and various digital contents (for example, text, images, vector graphics, animations, videos, and audios) are combined and provided in various webpage formats, rather, it is inconvenient for a user to search for desired content from the combined digital contents.

SUMMARY

An aspect of the present disclosure is to substantially solve at least the above problems and/or disadvantages and to provide at least the advantages below. Accordingly, an object of the present invention is to provide a method and device for displaying digital content according to a selectable layout of a webpage in an electronic device.

Another aspect of the present disclosure is to provide a method and device for leveling the contents of a desired webpage according to a user's selection.

According to one aspect of the disclosure, a method is provided comprising: retrieving a markup language file associated with a document, the markup language file including an identifier for retrieving a content item that is part of the document; parsing the markup language file into a first plurality of objects, the first plurality of objects including a first object associated with the content item; assigning a respective layout level to each one of the first plurality of objects; and outputting the document in accordance with a first layout level by: (i) retrieving the content item from a remote source in response to the layout level of the first object matching the first layout level, and (ii) rendering one or more objects from the first plurality based the one or more objects' respective layout levels matching the first layout level.

According to another aspect of the disclosure, an electronic device is provided comprising a processor configured to: retrieve a markup language file associated with a document, the markup language file including an identifier for retrieving a content item that is part of the document; parse the markup language file into a first plurality of objects, the first plurality of objects including a first object associated with the content item; assign a respective layout level to each one of the first plurality of objects; and output the document in accordance with a first layout level by: (i) retrieving the content item from a remote source in response to the layout level of the first object matching the first layout level, and (ii) rendering one or more objects from the first plurality based the one or more objects' respective layout levels matching the first layout level.

According to another aspect of the disclosure, a method is provided comprising: receiving first data including at least part of data corresponding to digital contents in the electronic device; determining at least one rule among a plurality of rules for an output method of the first data through a display functionally connected to the electronic device; obtaining second data corresponding to the at least one rule on the basis of the first data; and displaying the obtained second data on the display.

According to another aspect of the disclosure, an electronic device is provided comprising at least one memory configured to store data, and at least one processor configured to execute a digital contents display module, wherein the digital contents display module configured to receive first data including at least part of data corresponding to digital contents in the electronic device; determine at least one rule among a plurality of rules for an output method of the first data through a display functionally connected to the electronic device; obtain second data corresponding to the at least one rule on the basis of the first data; and display the obtained second data on the display.

BRIEF DESCRIPTION OF THE DRAWINGS

The above features and advantages of the present disclosure will become more apparent from the following detailed description when taken in conjunction with the accompanying drawings in which:

FIG. 1A is a diagram of an example of a web page source code, according to aspects of the disclosure;

FIG. 1B is a schematic diagram of a web browser architecture, according to aspects of the disclosure;

FIG. 10A, FIG. 10B and FIG. 10C are a diagram illustrating an example of a user interface for changing the layout level of displayed content, according to aspects of the disclosure;

FIG. 14A, FIG. 14B and FIG. 14C are diagrams illustrating different examples of a user interface for changing the layout level of displayed content, according to aspects of the disclosure;

DETAILED DESCRIPTION

Figure 2A:
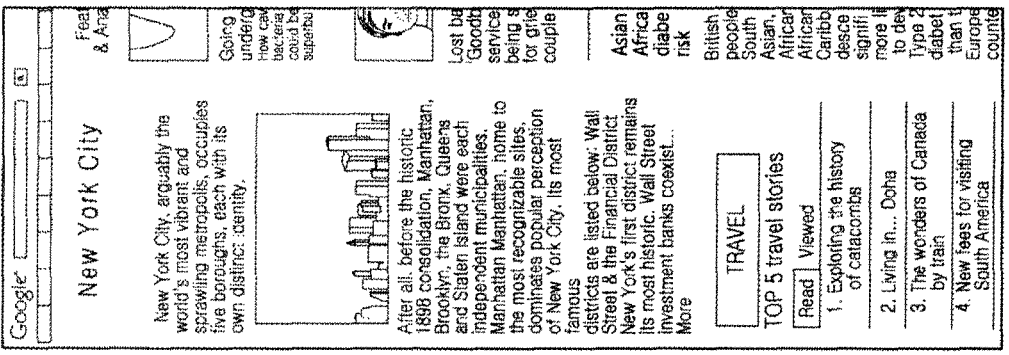
FIG. 2A, FIG. 2B and FIG. 2C are diagrams illustrating an example of different layout levels for displaying a webpage, according to aspects of the disclosure.

Hereinafter, various aspects of the disclosure will be described with reference to the accompanying drawings.

Hereinafter, a method and device for displaying a webpage in a web browser according to a layout level of a user selectable webpage in an electronic device are described. However, various embodiments of the present disclosure are not limited to a webpage or a web browser and may be applied to various types of electronic documents/applications (for example, e-mail and e-book). Here, the layout level of the webpage may mean one of a plurality of levels for representing the webpage by combining/arranging objects configuring the webpage.

Digital contents used for description below may mean an object such as text, image, Flash, script and its execution result, animation, audio or video or may be used as the term corresponding to one entire webpage.

FIG. 1A is a diagram of an example of a web page source code, according to aspects of the disclosure. Referring to FIG. 1A, in order to display a webpage, electronic document (e.g., source code 100) stored in a server is received by an electronic device including a web browser. A webpage form 110 may be generated and displayed based on the source code 100. The webpage form 110 may be generated by executing a process (for example, a Webkit operation process such as parsing and script execution) designated in the electronic device. For example, the electronic document may include any suitable type of markup language such as HTML, XHTML, XML, plain XML, scalable Vector Graphics (SVG (scalable vector graphics), and XML User-interface Language (XUL)). The web browser may include any suitable type of web browser, such as Tizen browser, Samsung browser, Internet Explorer, Firefox, Safari, Chrome, or Opera.

FIG. 1B is a schematic diagram of a web browser architecture, according to aspects of the disclosure. As illustrated, in this example, the architecture may include a loading module 120, a parsing module 121, a layout module 122, a JavaScript execution module 123, a painting module 124, and a UI updating module 125. Each of the modules 120-125 may be implemented hardware, software, and-or combination of hardware and software.

The loading module 120 may load source code through a web address or local document. The parsing module 121 process the source code to generate a Document Object Model (DOM) tree. The layout 122 module may generate a render tree based on the DOM tree. The render tree may specify visual attributes according to style information and HTML display rules. For example, a render object may have the position and size to be displayed on a screen.

The javascript execution module 123 may execute any JavaScript code that is present in the source code of the web page. The painting module 124 may form a shape using a render tree changed through processing of JavaScript. For example, the painting module 124, as an operation for filling a designated memory space with red-green-blue (RGB) values, may store detailed contents on with what position, size, and color the drawing is made. The UI updating module 125 may display the operation result of the painting module 124 on a display.

Figure 4:
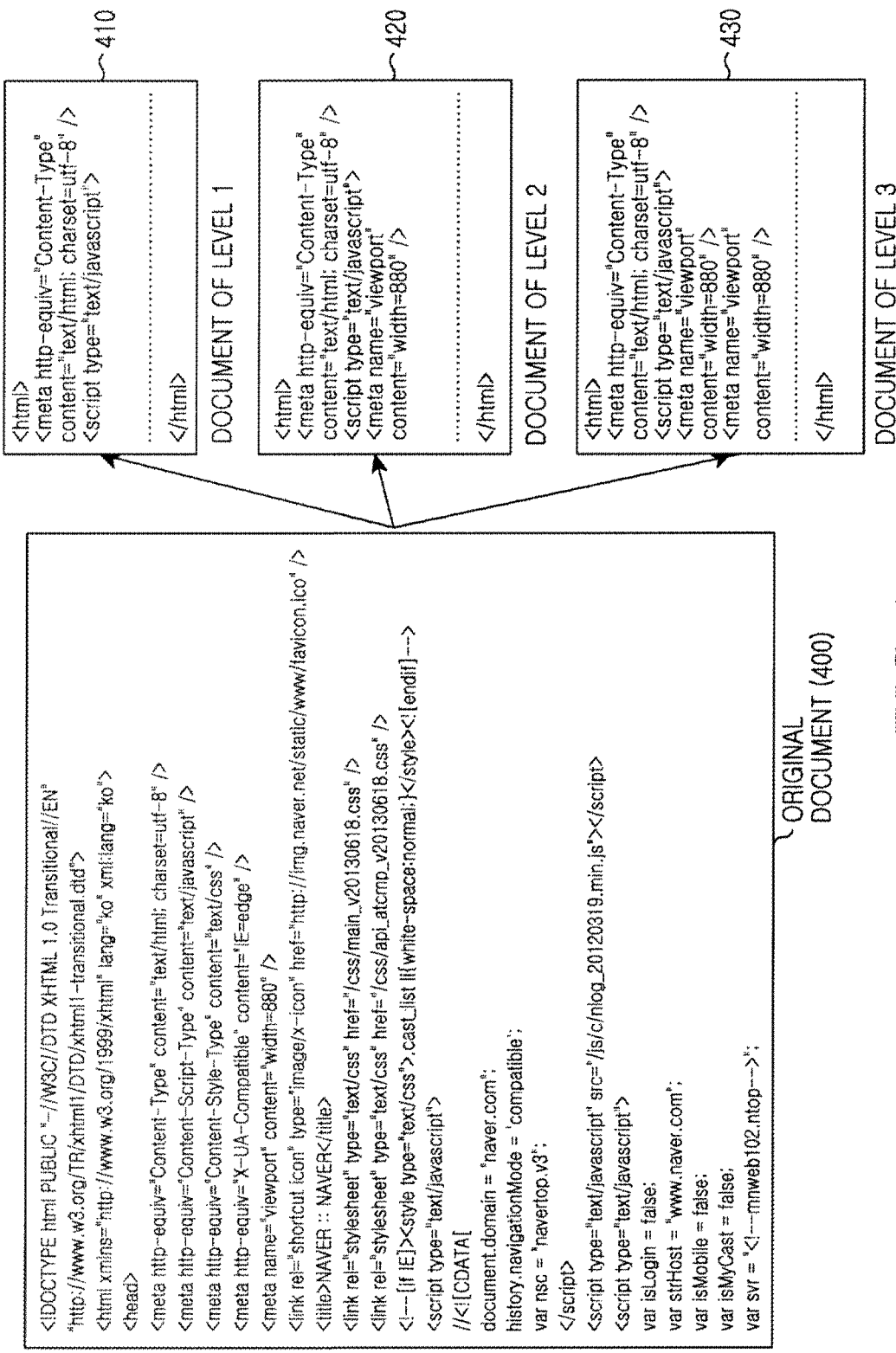
FIG. 4 is a diagram of an example of different blocks of source code that correspond to different layout levels, according to aspects of the disclosure.

According to various embodiments of the present disclosure, the source code obtained from the loading module 120 may be divided into a plurality of sub codes according to a webpage layout level (see FIG. 4).

Figure 3:
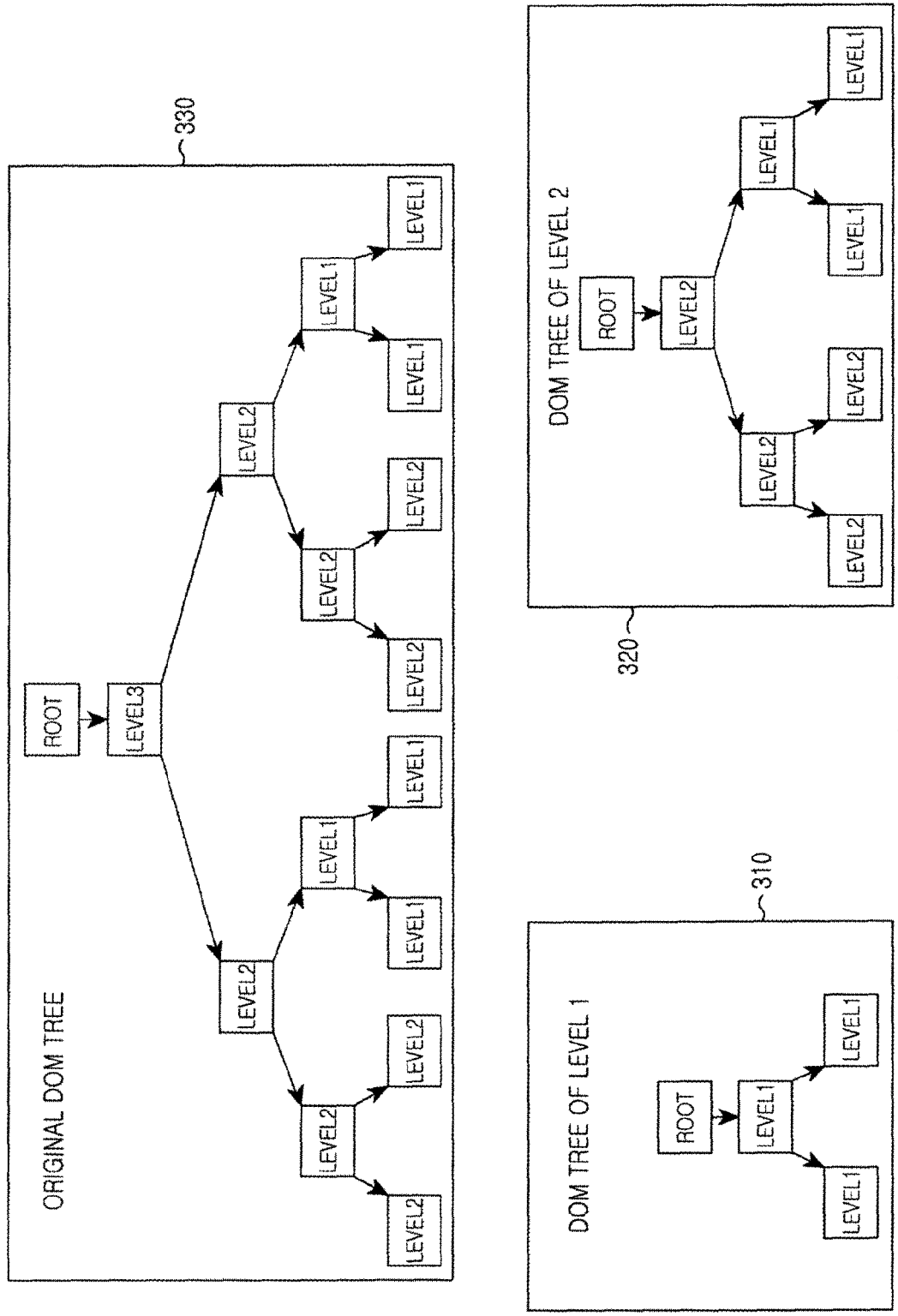
FIG. 3 is a diagram depicting examples of DOM trees that correspond to the layout levels of FIGS. 2A-C, according to aspects of the disclosure.

According to various embodiments of the present disclosure, the DOM tree generated by the parsing module 121 may be divided into a plurality of sub DOM trees according to a webpage layout level (see FIG. 3).

Figure 5:
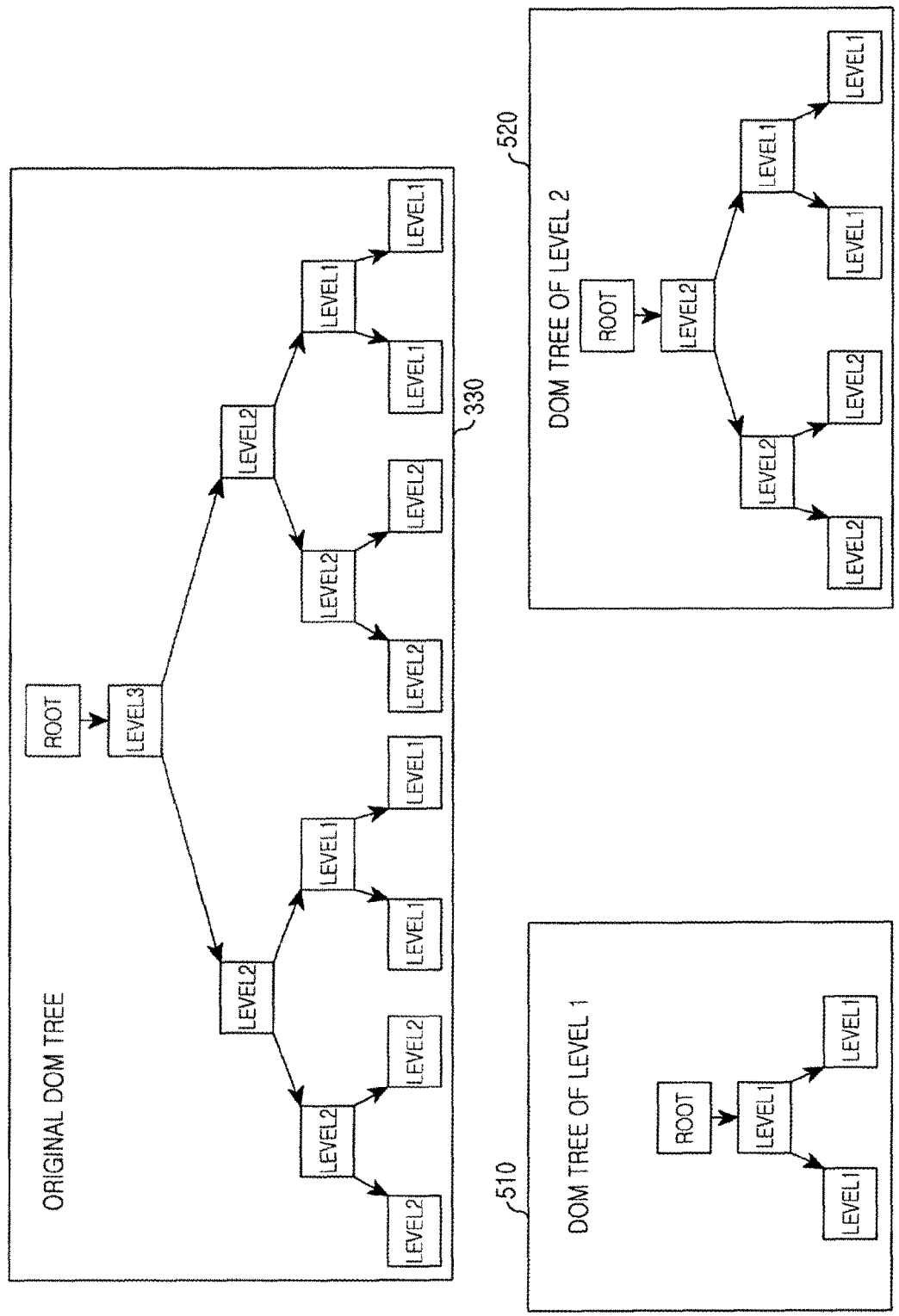
FIG. 5 is a diagram depicting examples of render trees, according to aspects of the disclosure.

According to various embodiments of the present disclosure, in the layout module 122, the DOM tree may be divided into a plurality of sub render trees according to a webpage layout level (see FIG. 5).

Hereinafter, various embodiments of the present disclosure are described based on a Webkit based browser but these may be applied to a similar form to a Webkit based form. A DOM is created in a tree form that is interpretable in a browser by analyzing electronic document and in the case of not the Webkit based browser, such an operation may be performed and a tree may be in a form for structuring easily analyzable forms. Additionally, the Webkit operation process may operate similarly in a designated software program that is capable of interpreting the recommendations of World Wide Web Consortium (W3C).

Figure 2B:
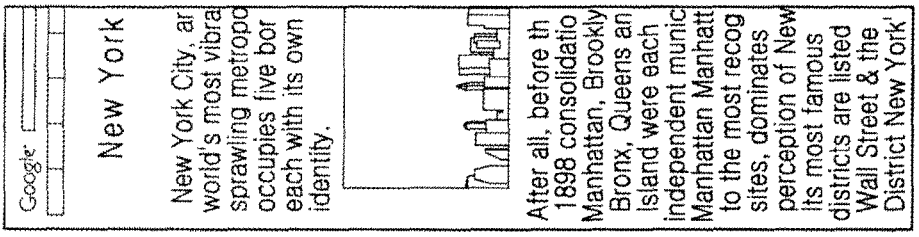
Figure 2C:
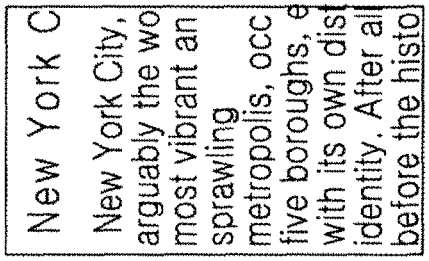

FIGS. 2A-C is are diagrams illustrating various examples of web-page layout levels. As illustrated, the same webpage may be displayed differently based on a chosen layout level. Each layout level may be illustrated with a different number of objects (e.g., tags corresponding to images, tables, etc.) that are part of the web page. Thus, when the web-page is displayed in accordance with a given layout level, objects in the webpage associated with the particular layout level may be configured (or rendered) while other objects may be left out. In some implementations, each objects may be associated with a particular tag (e.g., an HTML tag) that is part of a markup language file (e.g., HTML file) representing the webpage.

FIG. 2A depicts a webpage that is output in accordance with a layout level 3. As illustrated, when the webpage is configured in accordance with a layout level 3 all content items that are part of the webpage are displayed. FIG. 2B, depicts the webpage when the webpage is output in accordance with a layout level 2. As illustrated, when the webpage is output in accordance with layout level 2, some content items that are part of the webpage are omitted (or not configured). Specifically, in this example, the "travel stories menu" is excluded from the webpage's rendition when the webpage is output in accordance with layout level 3. FIG. 2C depicts the webpage when the webpage is output in accordance with a layout level 1. In this example, when the webpage is configured in accordance with layout level 1, only text that is part of the webpage's body is configured and all other content items that are part of the webpage (e.g., the "travel stories menu" and images) are excluded.

Although the three layout levels of the webpage are exemplarily described in FIGS. 2A to 2C, a layout level of a webpage may be more than or less than the three levels according to various embodiment of the present disclosure.

According to various embodiments of the present invention, when a DOM tree is configured, an example for determining a plurality of layout levels according to a method (see FIG. 3) of determining a level of each node in the DOM tree and a method (see FIG. 4) of generating several pairs of electronic documents by utilizing script will be described.

A DOM may mean an operation (for example, the parsing module 121 of FIG. 1B) for transforming a main resource (for example, source code)/sub resource (for example, an image) configuring electronic document into a tree form that is easily interpretable in a web browser. The term "tree" may be an operation for representing a form of an easily analyzable operation structurally by analyzing a mutual relationship and in a similar form of a program not using a DOM tree, if a similar operation is processed, this may be regarded as the same.

With a method of creating a plurality of electronic documents by utilizing script, several electronic document files having different complexities may be extracted from inputted electronic document files through the application of different rules. Each DOM tree may be generated from each electronic document file. For example, as a method of changing electronic document, a DOM tree, or a render tree corresponding to a corresponding layout level, script may be used.

FIG. 3 is a diagram depicting an example of different DOM trees that can be generated for the webpage of FIGS. 2A-C. Each of the depicted DOM trees may correspond to a different webpage layout.

DOM tree 330 may correspond to layout level 3 (ex. original tree). Thus, as illustrated in FIG. 2A, when DOM tree 330 is configured (or rendered), the web page may be displayed in accordance with layout level 3. Each node in DOM 330 may correspond to a different object that is part of the webpage. DOM 330 may include nodes for all objects that are part of the webpage. Specifically, each node may correspond to a different object that is part of the webpage. In some implementation, each node may be associated with an indication of a layout level that is assigned to the node's respective objects. For example, the nodes marked "level 1" may be associated with objects that are assigned to layout level 1. Similarly, the objects marked "level 2" may be associated with objects that are assigned to layout level 2.

In some implementations, DOM tree 330 may be generated based on a markup language file representing the webpage.

DOM tree 320 may correspond to layout level 2. DOM tree 320 may be generated based on DOM tree 330. When DOM tree 320 is configured, the web page may be displayed in accordance with layout level 2. DOM tree 320 may include nodes corresponding to a first subset of the nodes found in the webpage.

DOM tree 310 may correspond to layout level 1. DOM tree 310 may be generated based on DOM tree 330. When DOM tree 310 is configured, the web page may be displayed in accordance with layout level 1. DOM tree 310 may include nodes corresponding to a second subset of the objects found in the webpage. The second subset may be smaller than the first subset.

In some aspects, each object in the web page of FIG. 2 may be assigned a different layout level. Thus, when the webpage is parsed into DOM tree 330, objects assigned layout levels 1, 2, and 3 may be included into the DOM tree 330. By contrast, when the webpage is parsed into the DOM tree 320, only objects assigned levels 1 and 2 may be included into that DOM tree. Similarly, when the webpage is parsed onto the DOM tree 310, only objects assigned level 1 may be included into that DOM tree. In other words, the DOM tree corresponding to a particular layout level may include only objects assigned whose assigned levels are less than or equal to the tree's level.

In some aspects, DOM tree 330 may be used to configure the webpage in accordance with a user-selected layout level. For example, when a request is received to configure the webpage in accordance with layout level 2, DOM tree 330 may be processed to generate DOM three 320. Next, a render tree may be generated based on DOM tree 320. And finally, the render tree may be executed to paint the webpage in accordance with layout level 2.

FIG. 4 depicts an example of different sets of source code associated with each of the DOM trees of FIG. 3. For example, source code set 410, 420 and 430 may be generated by utilizing brief information of a original document 400. The source code set 410 may only include code corresponding to the objects in DOM tree 310. The Source code set 420 may only include code corresponding to the objects in DOM tree 320. The source code set 430 may only include code corresponding to the objects in DOM tree 330.

FIG. 5 is a diagram depicting examples of render trees. Render tree 510 and 520 is may be generate based on the DOM tree 330. For example, a DOM tree may be generated by parsing an electronic document file and a level of each node may be determined according to a predetermined rule by inserting a level as additional information into the DOM tree. This level information may be used in the next rendering operation for generating several pairs of render trees 510 and 520.

According to various embodiments of the present disclosure, the DOM tree may be generated based on a part of the original document 400. In correspondence to a DOM tree for part (for example, 410 and 420) of the original document 400, render trees 510 and 520 may be generated. Furthermore, a level (for example, a level 1 and a level 2) may be determined while the original document 400 is loaded partly. The electronic device may generate another render tree having the level is reflected.

According to various embodiments of the present disclosure, the original document 400 may load the remaining data. In correspondence to an operation for loading the remaining data, the DOM tree may be changed. In correspondence to the changed DOM tree, the render tree and the other render tree may be changed.

A rule regarding what information for each layout level of a webpage is to be represented may be defined according to a predetermined rule and detailed contents may be changed by a user's setting.

Table 1 below is an example of rules defining what contents for each level are to be represented.

TABLE 1

|  | Object (or tag) type | Object size | Layout | Contents |
|---|---|---|---|---|
| Level 1 | ① text | ① ~10 KB | ① reader tool form | ① important contents |
| Level 2 | ② image | ② ~50 KB | ② reader tool form + α(for example: image reduction arrangement) | ② additional contents for example,: related article |
| Level 3 | ③ script | ③ ~60 KB | ③ reader tool form + β1(for example: right frame removal) | ③ dynamic contents for example: Flash |
| Level 4 | ④ embed(or Flash) | ④ ~100 KB | ④ reader tool form + β2(for example,: lower frame removal) | ④ advertisements |
| Level 5 | ⑤ i frame | ⑤ ~100 KB | ⑤ original form | ⑤ entire original |
| User level |  | For example: A② + B④ + C① + D① |  |  |

In some implementations, a given object may be assigned to a particular layout level based on a type of the object. For example, object including text only may be assigned to level 1. Objects including images may be assigned to level 2. And objects including a script (or a portion thereof) may be assigned to level 3. As noted above, in some implementations, each object may include to a different HTML tag that is part of a markup language document.

In some implementations, a given object may be assigned to a particular level based on a size of the object. For example, objects smaller than 10 KB may be assigned to level 1. Objects of size 10-50 KB may be assigned to level 2. And objects of size 50-60 KB may be assigned to level 3.

The level 1 to level 5 in Table 1 are one example and the level may be divided into less or more than the five levels in various forms. Additionally, the application of further various levels may be considered by combining more than two criteria rather than one criterion. For example, there are a complex level applying the type and size of object and a complex level applying a layout and contents simultaneously. For example, the object size as the level 2, the object type as the level 4, the layout as the level 1, and the contents as the level 1 are combined and determined.

Here, a level is one method of distinguishing each level and the value itself of a level does not have the meaning. This may be referred to in a number of ways and this is possible when a term is in a level that a previous operation and the next operation are distinguishable.

Figure 6A:
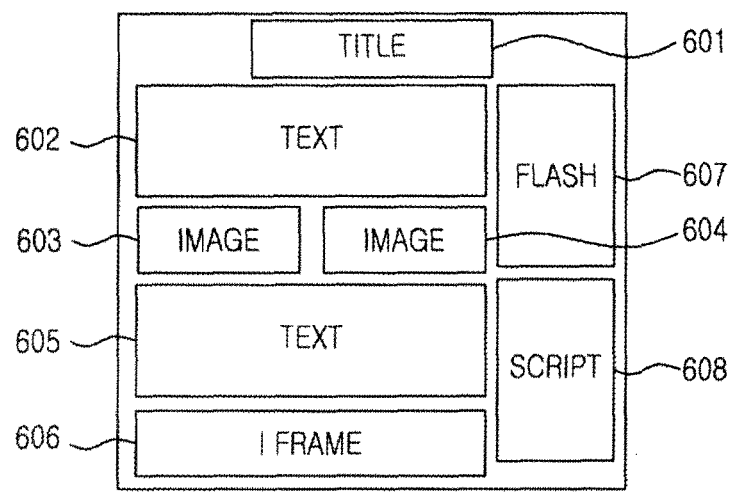
FIG. 6A, FIG. 6B and FIG. 6C are diagrams illustrating examples of various webpage renditions, according to aspects of the disclosure.
Figure 6B:
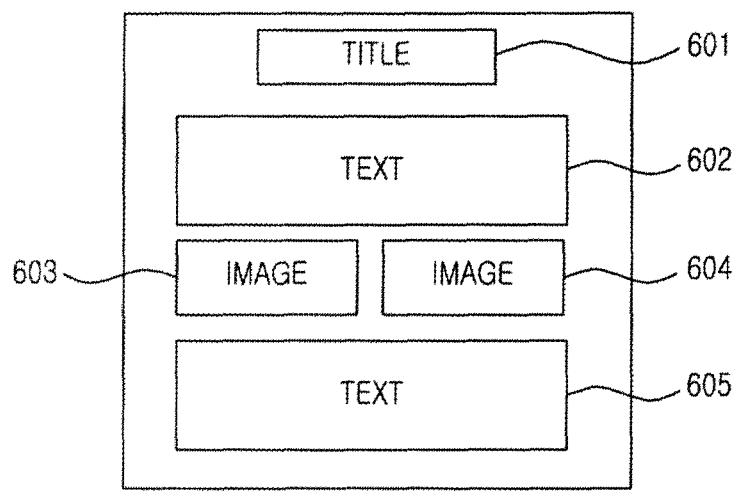
Figure 6C:
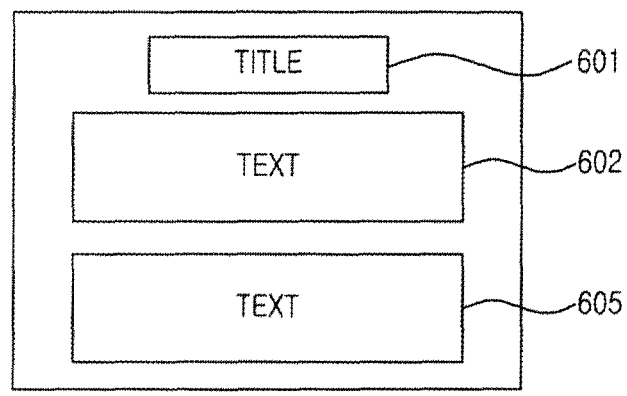

FIGS. 6A, 6B and 6C are a view illustrating a change of configuration for each object of a webpage according to a level as shown in Table 1. As shown in FIGS. 6A, 6B and 6C, depending on the complexities of objects in an existing webpage according to a level, targets to be expressed on a screen may change and additionally, the arrangement of objects may change by a user or a predetermined method. This part is in the same way as described above and thus, the level of object may be suggested in a number of ways and text/image/script/Flash/iframe mentioned below is suggested as one practical example. Configuration such as arrangement also may not be changed in an existing webpage or may be changed by a user or a designated method.

FIGS. 6A-C are diagrams illustrating examples of various webpage renditions, according to aspects of the disclosure. Referring to FIG. 6A, a configuration of the web page is shown in accordance with layout 3. As illustrated, when the webpage is output in accordance with layout 3, the configuration of the web page includes title 601, text blocks 602 and 604, images 603 and 604, i-frame 606, Flash content 607, and script content 608. Referring to FIG. 6B, when the webpage is output in accordance with layout 2, the configuration of the webpage includes only the title 601, text blocks 602 and 605, and images 603 and 604. Referring to FIG. 6C, when the webpage is output in accordance with layout 1, the configuration may include only the title 601, and text the text blocks 602 and 605.

The webpage layout for each level shown in FIGS. 6A to 6C is one embodiment and is not limited to FIGS. 6A to 6C so that it may be provided in various forms.

Figure 7A:
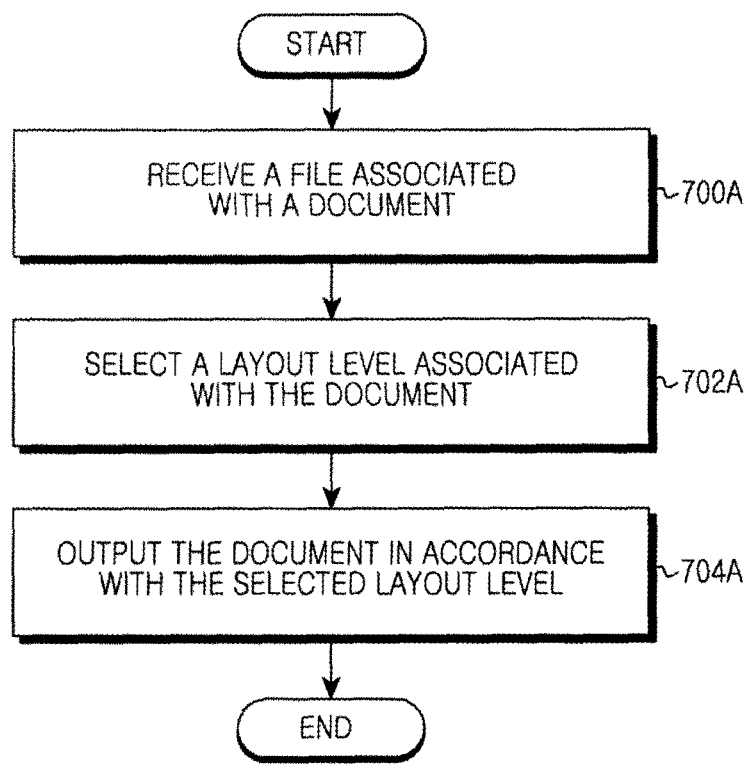
FIG. 7A is a flowchart of an example of a process, according to aspects of the disclosure.

FIG. 7A is a flowchart of an example of a process, according to aspects of the disclosure. In operation 700A, an electronic device may receive a file associated with a document. In some implementations, the electronic device may received the file associated with the document from a server. The file may be a markup language file (e.g., HTML) and/or any other suitable type of file. The document may be a webpage and/or any other suitable type of document. In operation 702A, the electronic device may select a layout level for displaying the document. In some implementations, the layout level may be selected based on user input. In some implementations, the electronic device may identify a preset layout level. In operation 704B, the electronic device may output (or display) the document in accordance with the selected layout level.

Figure 7B:
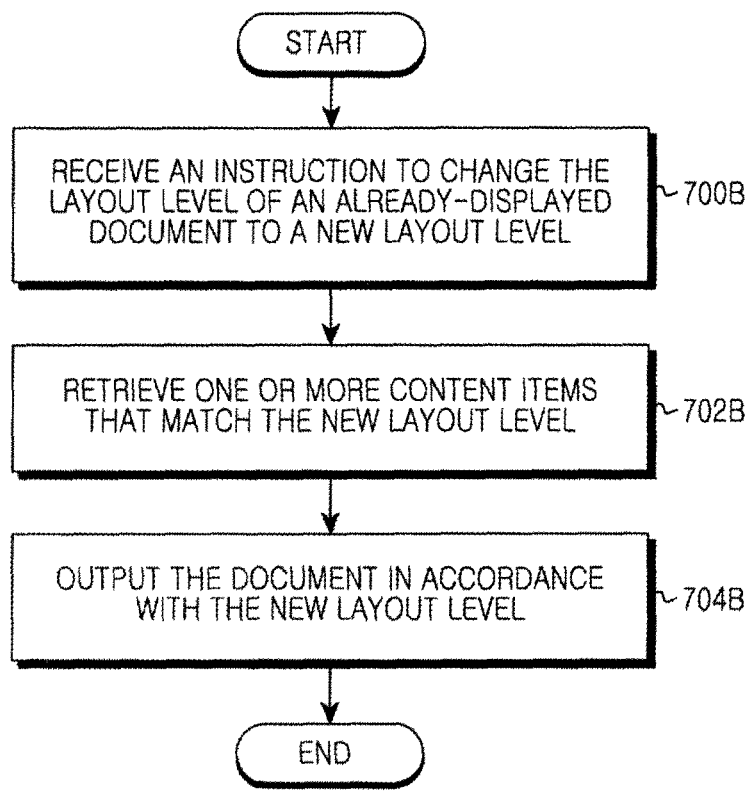
FIG. 7B is a flowchart of an example of a process, according to aspects of the disclosure

FIG. 7B is a flowchart of an example of a process, according to aspects of the disclosure. In operation 700B, an electronic device may receive an instruction to change the layout level of an already-displayed document (e.g., a web page) to a new layout level. For example, the instruction may be one asking that the displayed content be switched from layout level 2 to layout level 3. In operation 702B, the electronic device may identify one or more objects that are assigned the new layout level (e.g., layout 3) and retrieve content items corresponding to the objects, such as images and/or scripts. The electronic device may receive the entire data constituting the content or only a portion thereof. In operation 704B, the document may output the document in accordance with the new layout level.

The new layout level is selected from the plurality of digital contents layouts may be performed before or after digital contents are received.

If the selecting of the new layout level is performed before digital contents are received, receiving at least part of entire data corresponding to the digital contents may include receiving data including markup language (or source) for the original digital contents and receiving at least one selected contents type for the modified digital contents. The displaying of the digital contents may include displaying digital contents with a layout configured to display the at least one contents type. According to various embodiment of the present disclosure, the displaying of the digital contents may include displaying the digital contents before entire data corresponding to the original digital contents is received.

When the selecting of the new layout level is performed after the receiving of the at least part of the entire data corresponding to the digital contents, the displaying of the digital contents may include displaying digital contents with a layout configured to display at least one contents type on the basis of the selection of the digital contents layout.

After the receiving of the digital contents layout selection input, receiving another part of the entire data may be further performed on the basis of the selection.

On the basis of the digital contents layout selection, determining an amount of data to be received in correspondence to the modified digital contents may be further performed.

Figure 8:
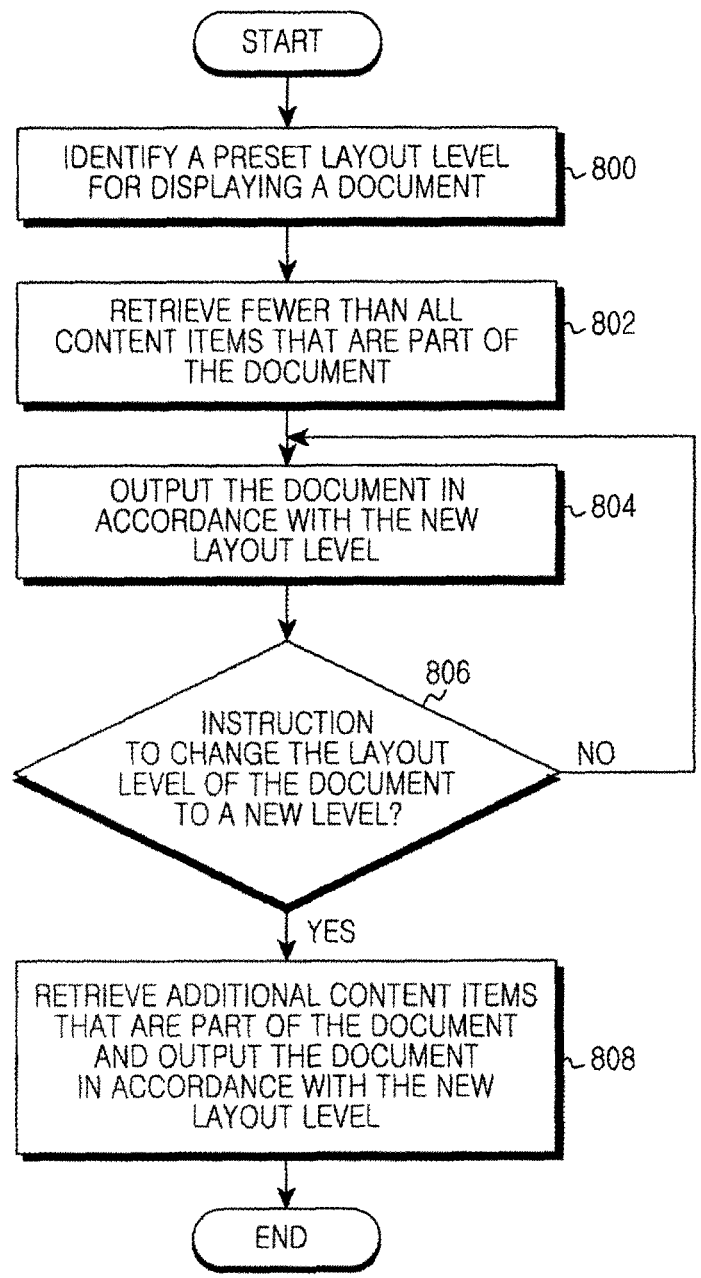
FIG. 8 is a flowchart of an example of a process, according to aspects of the disclosure.

FIG. 8 is a flowchart of an example of a process, according to aspects of the disclosure. In operation 800, the electronic device may identify a preset layout level for a document (e.g., a webpage). In operation 802, the electronic device retrieves fewer than all content items that are part of the document. For example, the electronic device loads some or all of data corresponding to a webpage (or electronic document and digital contents) into a memory. Operation 802 is identical to the resource loading module 120 of FIG. 1B. In operation 804, the electronic device output the document in accordance with the preset layout level.

In operation 806, the electronic device detects an instruction to change the layout level of the webpage a new level. In operation of 808, the electronic device retrieves additional content items from the document that were not retrieved at operation 802. As can be readily appreciated, these content items may be associated with objects whose layout level matches the new layout level, but does not match the preset layout level. Finally, after the additional content items are retrieved, the document is output in accordance with the new layout level.

The layout level of the document may be divided by at least one of the type of object, a tag type, the size of object, a layout form, and the type of contents, all of which configure the webpage, or a combination of at least one of them.

Additionally, before outputting (or displaying) of a webpage corresponding to the loaded data (or source code or resource), a source code for each layout level of the webpage may be generated (see FIG. 4) or a DOM tree may be generated (see FIG. 3), or a render tree may be generated (see FIG. 5).

For example, according to the preset layout level in an electronic device, displaying a webpage corresponding to the loaded data may include painting from a designated render tree corresponding to the preset layout level. That is, painting from a render tree that a user selects currently among render trees corresponding to the layout levels of generated several webpages may be performed.

Figure 9:
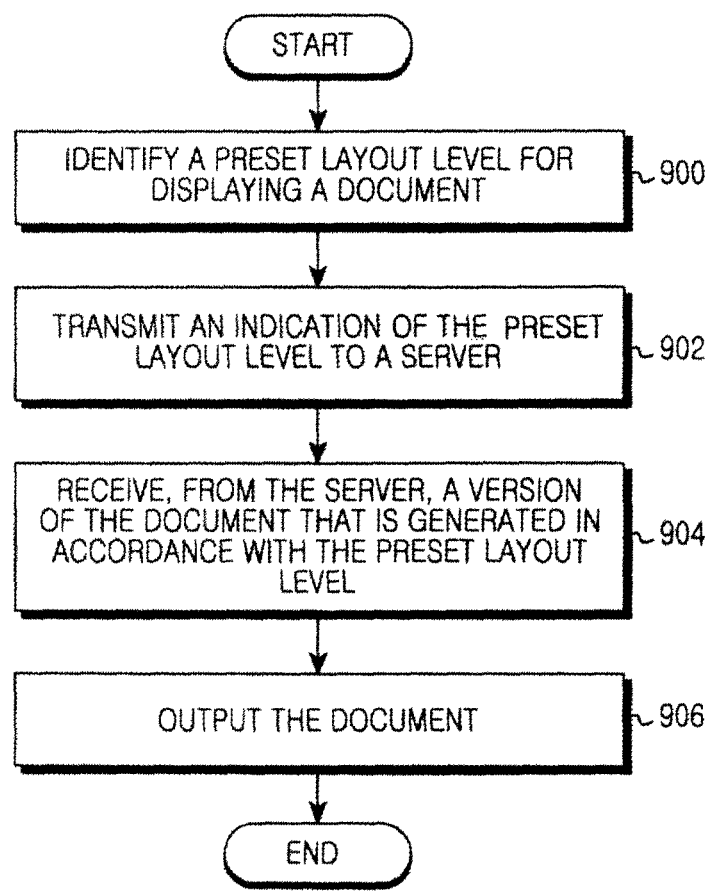
FIG. 9 is a flowchart of an example of a process, in accordance with aspects of the disclosure.

FIG. 9 is a flowchart of an example of a process, in accordance with aspects of the disclosure. In operation 900, the electronic device may identify a layout level for displaying a particular document. The layout level may be a default layout level or one that is specified via user input. In operation 902, the electronic device transmits an indication of the layout level to a server. In operation 904, the electronic device receives from the server data constituting the document. In some implementations, the data constituting the document may include only objects whose content level matches the preset content level. Thus, in this example, the server may perform the operations discussed with respect to FIGS. 3-6C. In operation 906, the electronic device renders the received data to display the document in accordance with the layout.

A situation that an original webpage switches into another layout level or a layout level different from an original webpage switches into a designated layout level in a browser may be considered. Switching into a corresponding level is possible through a gesture or S pen input on a conventional reader mode/browser. Additionally, after a long press on a designated portion, a level may be changed through an operation for moving toward the top/bottom.

Additionally, the method of switching the level may be targeted on a designated area or a designated object. For example, a method is to change a level when a corresponding button is selected after providing a designated button. Additionally, various intuitive methods for changing a level, for example, up/down or left/right gestures may be utilized. Various gestures for setting a designated direction and value, for example, flick direction/scroll direction/position difference of double tab/direction of rotation scroll, may be utilized for the methods. In operations for level switching, a trigger operation may precede or not.

Various embodiments for level switching may be suggested as shown in FIG. 10 to FIG. 18 and are just exemplary as mentioned above so that more various operations may be considered. Besides an on-screen input method, a delivery method through voice or sound, a delivery method of applying vibration to a user device, and a delivery method through a hardware key such as a volume key may be considered.

FIGS. 10A-C are a diagram illustrating an example of a user interface for changing the layout level of displayed content, according to aspects of the disclosure. Referring to FIG. 10A, a webpage is displayed in a web browser. The web browser is provided with a interface element 1000 (e.g., a button). When a user touches the interface element 1000, performs a dragging gesture, and then releases the interface element 1000, the layout level of the displayed web page is changed (as shown FIG. 10B or 10C). Changing the layout level of the webpage may include re-configuring the web page in accordance with a layout level that is selected based on a characteristic of the users' input. For example, if the dragging gesture is performed in the right direction, the layout level of the webpage may be increased (e.g., changed from layout level 2 to layout level 3). As another example, if the dragging gesture is performed in the left direction, the layout level of the web page may be decreased (e.g., changed from layout level 2 to layout level 1).

In some implementations, as the dragging gesture is performed, a visual effect may be displayed on the button 1000. For example, a circle may be increased or reduced as shown in FIG. 10B. As another example, a rectangle may be increased or reduced as shown in FIG. 10C.

Figure 11A:
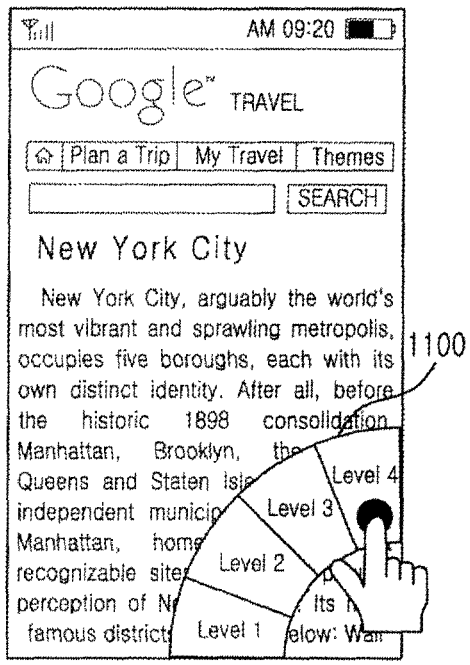
FIG. 11A, FIG. 11B, FIG. 11C and FIG. 11D are diagrams illustrating different examples of a user interface for changing the layout level of displayed content, according to aspects of the disclosure.
Figure 11B:
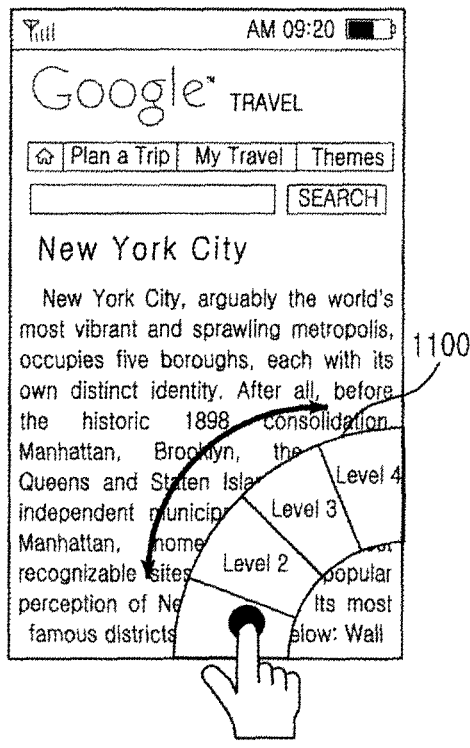

FIGS. 11A-D are diagrams illustrating different examples of a user interface for changing the layout level of displayed content, according to aspects of the disclosure. Referring to FIG. 11A, the interface element 1100 may have a fan shape. Initially, when the web page is first displayed, the interface element 1100 may be hidden. Afterwards, when user touch (user input) is detected at a predetermined location in the web browser's interface (or the web page), the interface element 1100 is displayed. After the interface element 1100 is displayed, the user may select a desired layout level for the web page by touching a particular location in the interface element 1100. Alternatively, as illustrated in FIG. 11B, when swept (user input) is detected at a predetermined location in the web browser's interface (or the web page), the interface element 1100 is displayed.

Figure 11C:
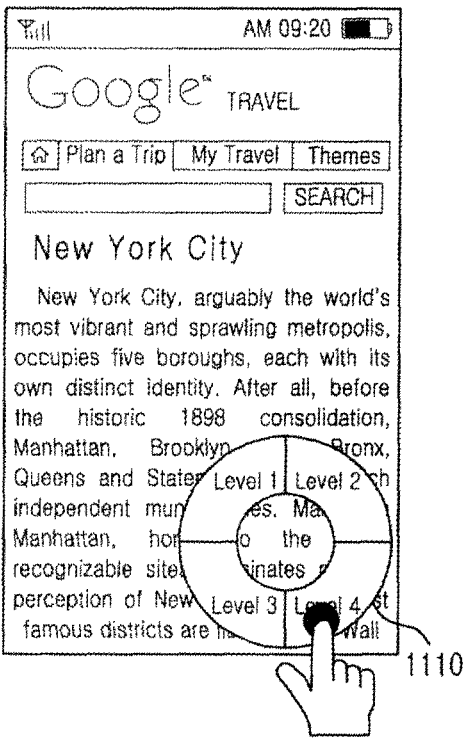
Figure 11D:
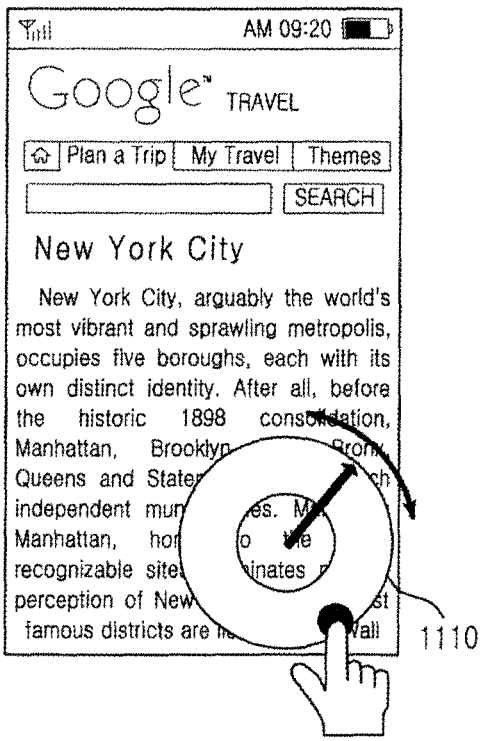
Figure 12A:
FIG. 12A, FIG. 12B, FIG. 12C and FIG. 12D are diagrams illustrating different examples of a user interface for changing the layout level of displayed content, according to aspects of the disclosure.
Figure 12B:
Figure 12C:
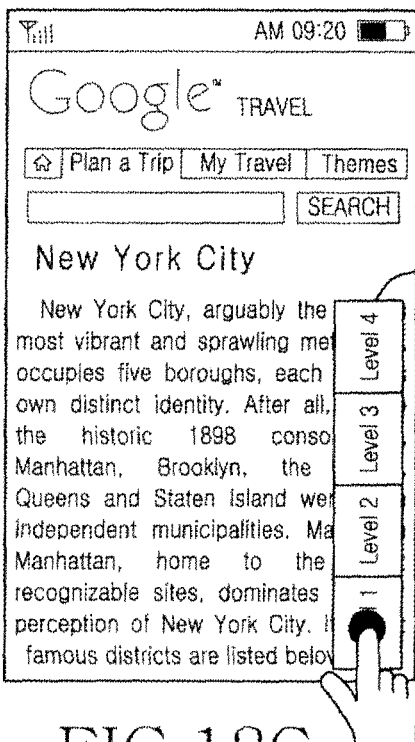
Figure 12D:
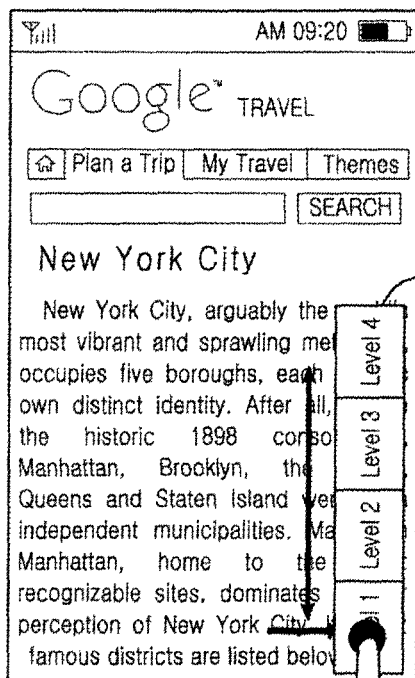

As illustrated in FIG. 11C-D, the interface element 1110 may have a circular shape. As shown, in FIG. 11C when user touch (user input) is detected at a predetermined location in the web browser's interface (or the web page), the interface element 1110 is displayed. Alternatively, when swept (user input) is detected at a predetermined location in the web browser's interface (or the web page), the interface element 1110 is displayed.

FIGS. 12A-D are diagrams illustrating different examples of a user interface for changing the layout level of displayed content, according to aspects of the disclosure. In this example, a webpage is displayed in a web browser. The layout level of the webpage may be changed by touching or performing another input gesture on interface element 1200. In this example, when user touch is detected at a predetermined location in the web browser's interface (or the web page), rectangular interface element 1200 is displayed in a horizontal direction (as shown FIG. 12A). Alternatively, when swept is detected at a predetermined location in the web browser's interface (or the web page), the rectangular interface element 1200 is displayed in the horizontal direction (as shown FIG. 12B). Alternatively, when user touch is detected at a predetermined location in the web browser's interface (or the web page), rectangular interface element 1200 is displayed in a vertical direction (as shown FIG. 12C). Alternatively, when swept is detected at a predetermined location in the web browser's interface (or the web page), the rectangular interface element 1200 is displayed in the vertical direction (as shown FIG. 12D). The user may change the layout level of the webpage by either performing discrete touches and/or sliding gestures on the interface element 1200.

Figures 13A, 13B:
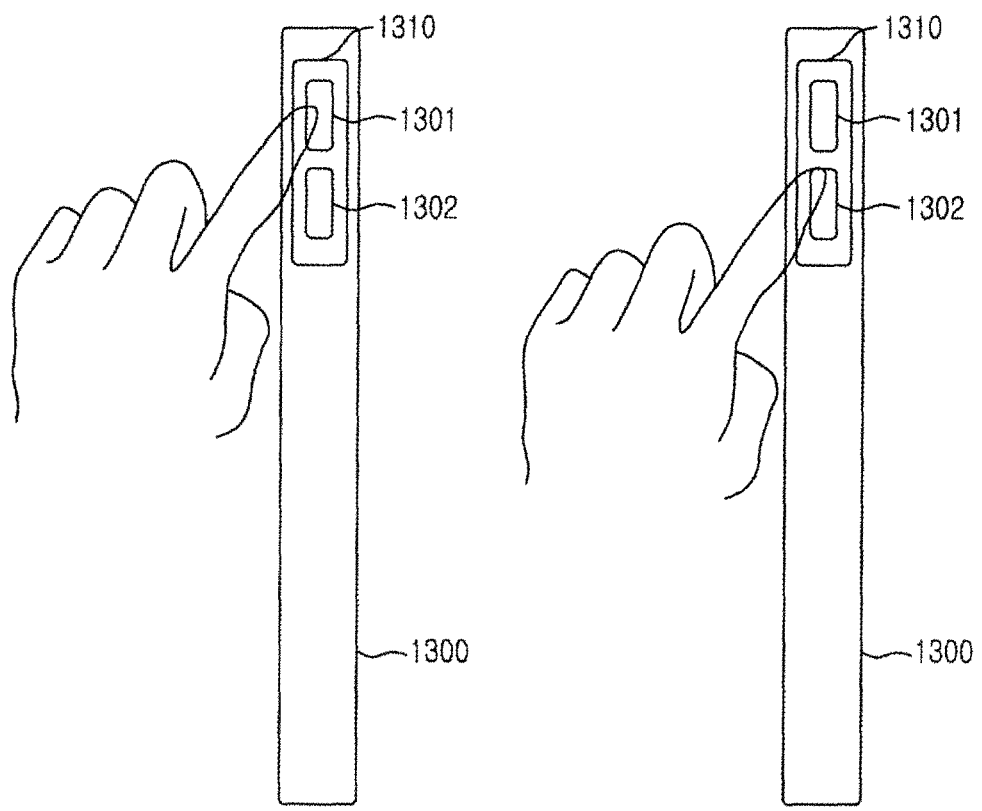
FIG. 13A and FIG. 13B are diagrams illustrating different examples of a user interface for changing the layout level of displayed content, according to aspects of the disclosure.

FIGS. 13A-B are diagrams illustrating different examples of a user interface for changing the layout level of displayed content, according to aspects of the disclosure. In this example, a volume keypad 1310 of an electronic device 1300 is used to change the layout level of a webpage (or another content item) that is displayed on the electronic device 1300. In one aspect, the volume keypad 1310 may be assigned the secondary function of controlling the layout level of the webpage when the webpage is displayed. In another aspect, the volume up button 1301 may be used increase the layout level of the webpage (as shown FIG. 13A), and the volume down button 1302 may be used to decrease the layout level of the webpage (as shown FIG. 13B). Although in this example the device 1300's volume buttons are used to change the layout level of the webpage, in other examples any other type of hardware button(s) on the electronic device may be used.

FIGS. 14A-C are diagrams illustrating different examples of a user interface for changing the layout level of displayed content, according to aspects of the disclosure. In this example, a webpage is displayed by the electronic device 1400 (as shown FIG. 14A). The layout level of the webpage is controlled by shaking (or otherwise moving) the electronic device 1400. For example, when the device is accelerated (or shaken or moved) in direction $d_1$, the layout level of the webpage may be increased (as shown FIG. 14B). As another example, when the device is accelerated (or shaken or moved) in direction $d_2$, the layout level of the webpage may be decreased (as shown FIG. 14C). In some implementations, when the layout level of the webpage is changed, an indication of the new layout level may be output by the electronic device 1400. In some implementations, the movement (or shaking) of the electronic device 1400 may be detected by using a gyro sensor and/or any other suitable type of sensor.

Figures 15A, 15B:
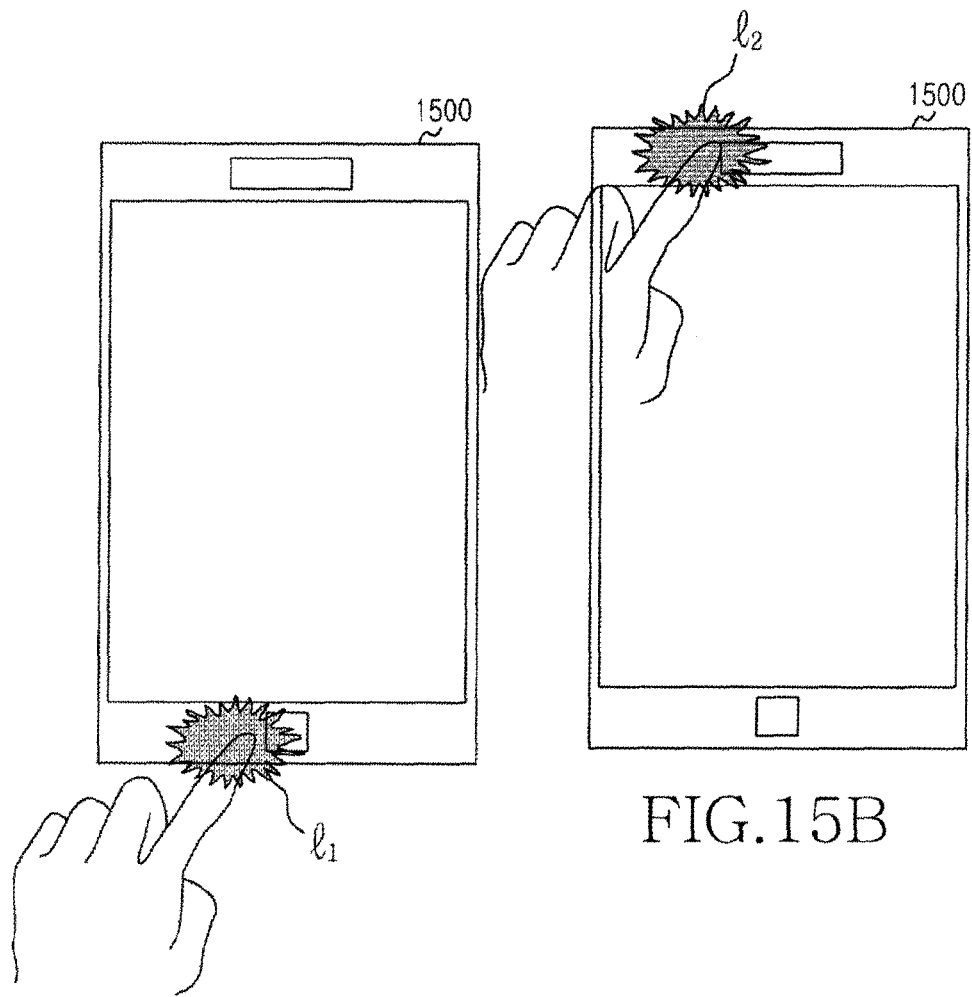
FIG. 15A and FIG. 15B are diagrams illustrating different examples of a user interface for changing the layout level of displayed content, according to aspects of the disclosure.

FIGS. 15A-B are diagrams illustrating different examples of a user interface for changing the layout level of displayed content, according to aspects of the disclosure. In this example, a webpage is displayed by the electronic device 1500. The layout level of the webpage is controlled by tapping (ex, impact/vibration) different portions of the electronic device. For example, when a tap is performed at a first location $l_1$ in the bezel of the electronic device, the layout level of the webpage may be increased (as shown FIG. 15A). As another example, when a tap is performed at a second location $l_2$, at the bezel of the device, the layout level of the webpage may be decreased (as shown FIG. 15B). In some implementations, taps to the bezel of the electronic device may be detected by a sensor for detecting vibration or impact.

Figures 16A, 16B:
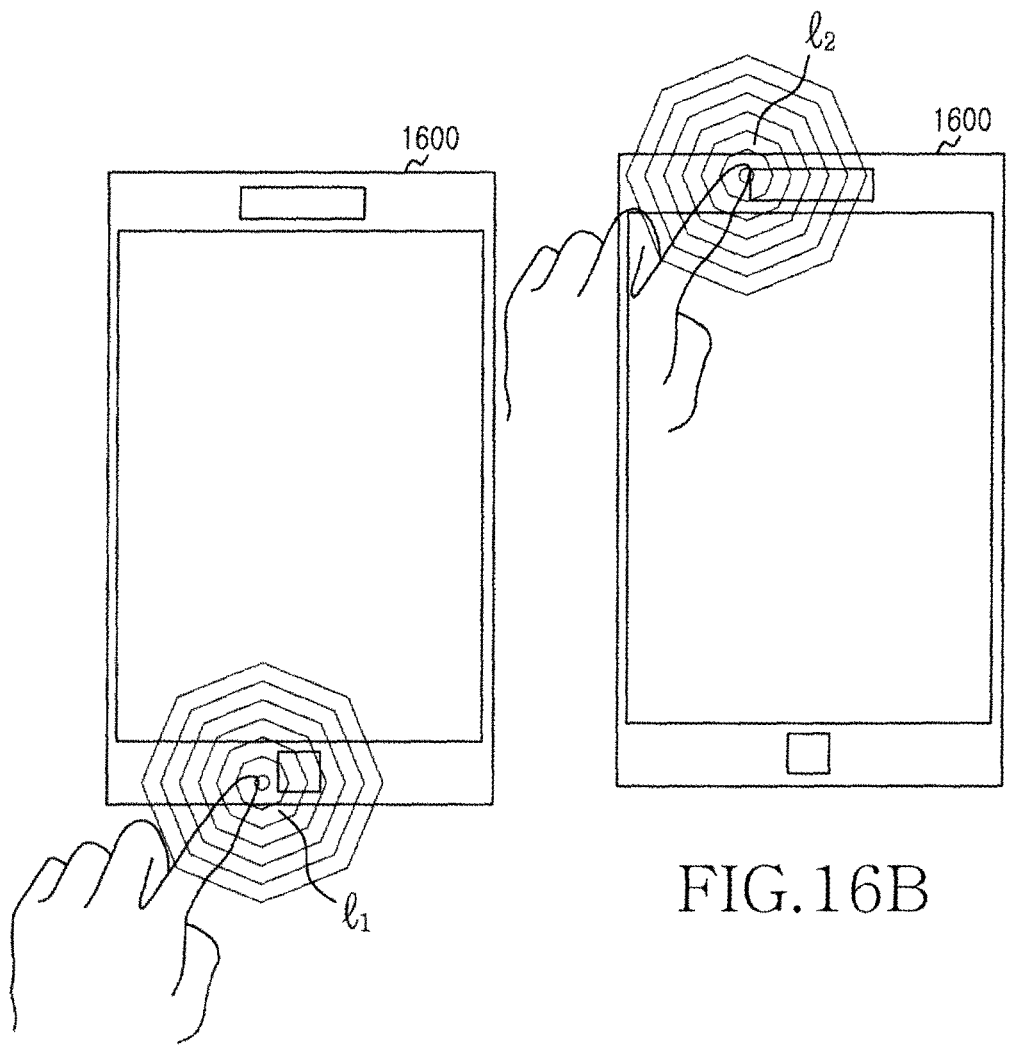
FIG. 16A and FIG. 16B are diagrams illustrating different examples of a user interface for changing the layout level of displayed content, according to aspects of the disclosure.

FIGS. 16A-B are diagrams illustrating different examples of a user interface for changing the layout level of displayed content, according to aspects of the disclosure. In this example, a webpage is displayed by the electronic device 1600. The layout level of the webpage is changed based on at least one of a type, an intensity, and estimated location (or direction) of origin of a sound that is detected by the electronic device 1600. In some implementations, the sound may be one that is produced when the user touches the bezel of the electronic device 1600. Thus, for example, when a sound of a predetermined type that originates at location $l_1$ is detected, the layout level of the webpage is increased (as shown FIG. 16A). By contrast, when a sound of the predetermined type, that originates at location $l_2$ is detected, the layout level of the webpage is decreased (as shown FIG. 16B). In some implementations, when the layout level of the webpage is changed, an indication of the new layout level may be output by the electronic device 1600.

Figure 17:
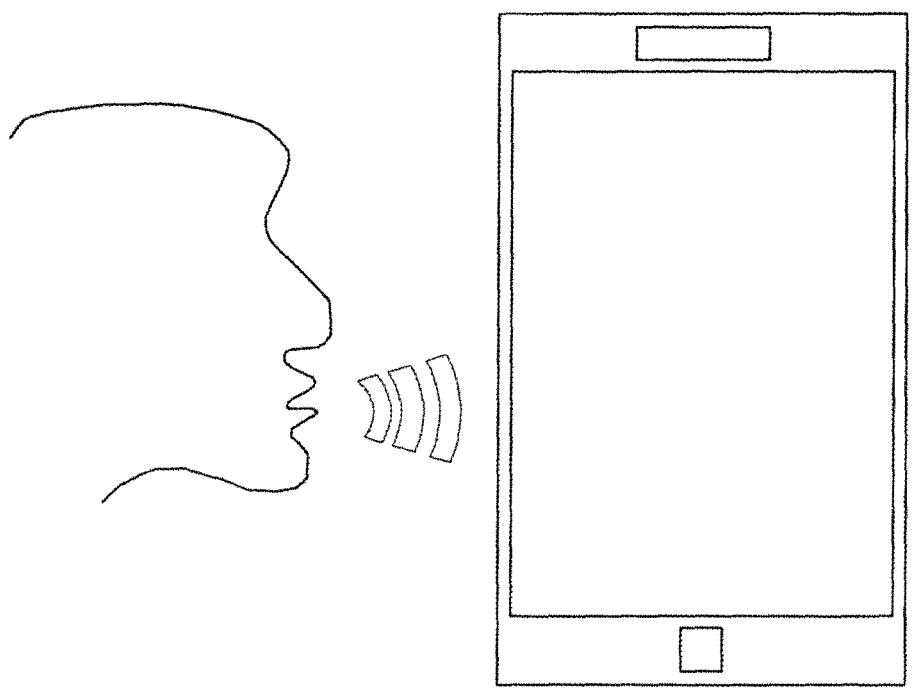
FIG. 17 is a diagram illustrating an example of a user interface for changing the layout level of displayed content, according to aspects of the disclosure.
Figure 18:
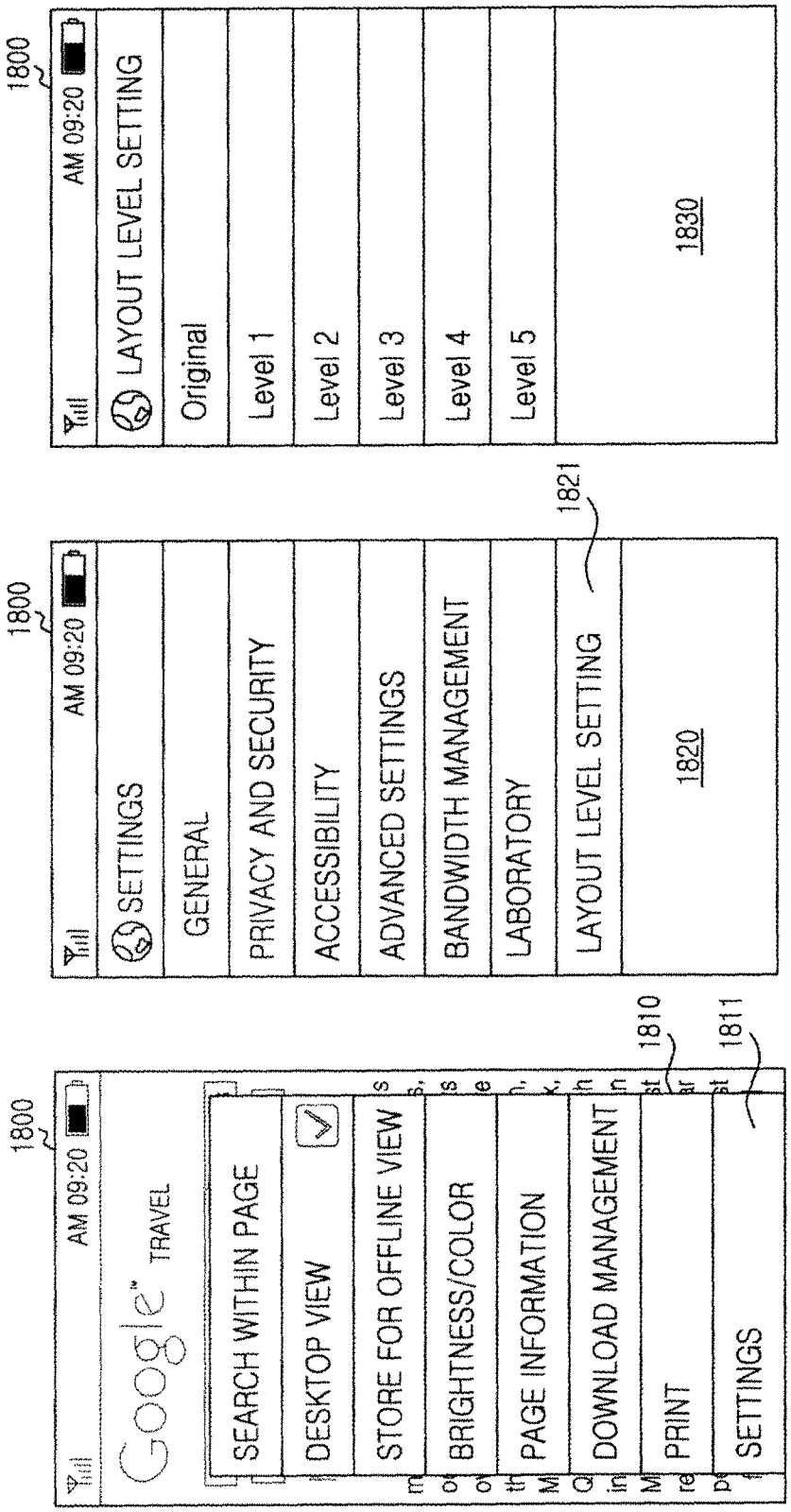
FIG. 18A, FIG. 18B and FIG. 18C are diagrams illustrating an example a user interface for setting a default layout level, according to aspects of the disclosure.

FIG. 17 is a diagram illustrating an example of a user interface for changing the layout level of displayed content, according to aspects of the disclosure. In this example, a webpage is displayed by the electronic device 1700. The layout level of the webpage is displayed based on spoken instructions from the user 1710. For example, when a first spoken instruction is detected, the layout level of the webpage may be increased. By contrast, when a second spoken instruction is detected, the layout of the webpage may be decreased.

Additionally, the method of switching the level may be targeted on a designated area or a designated object. For example, a method is to change a level when a corresponding button is selected after providing a designated button.

Additionally, various intuitive methods for changing a level, for example, up/down or left/right gestures may be utilized. Various gestures for setting a designated direction and value, for example, flick direction/scroll direction/position difference of double tab/direction of rotation scroll, may be utilized for the methods. In operations for level switching, a trigger operation may precede or not.

FIGS. 18A-C are diagrams illustrating an example a user interface for setting a default layout level, according to aspects of the disclosure. Referring to FIG. 18A, an electronic device 1800 may display a menu 1810. When the "settings" item 1811 is selected, a settings menu 1820 may be displayed (as shown FIG. 18B). When, the "layout level settings" item 1821 is selected, a menu 1830 may be displayed (as shown FIG. 18C). The menu 1830 identifies a plurality of layout levels. The user may select any one of the displayed layout level as a default layout level for all webpages (and/or any other suitable type of content item) that are displayed on the electronic device 1800. For example, when a webpage is downloaded to the electronic device 1800, after a default layout level is set, that webpage is displayed according to the default layout level. Afterwards, the user may increase the layout level of the web page as desired.

Additionally or alternatively, in some implementations, the default layout level of the device 1800 may be varied on a per-user basis. For example, when a first user is currently logged onto the device 1800 a first default layout level may be used and when a second user is logged on, a second default layout level may be used.

Additionally or alternatively, in some implementations, the default layout level of the device 1800 may be varied based on location. For example, when the device 1800 is located at its user's home, its default layout level may be set to a first value. By contrast, when the device 1800 is located at its user's home, its default layout level may be set to a second value.

Additionally or alternatively, in some implementations, the default layout level of the device 1800 may be varied based on time. In the morning, the electronic device 1800 may display webpages according to a first default layout level and at night, the electronic device 1800 may display webpages according to a second default layout level.

Furthermore, in changing a layout level, a change (background color, font, font color, and font size) of a style may be included.

The electronic device may include any suitable type of device. For instance, the electronic device may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (e.g., head-mounted-devices (HMDs) such as electronic glasses, electronic apparel, electronic bracelets, electronic necklaces, electronic accessories, electronic tattoos, and smart watches).

Additionally or alternatively, the electronic device may include a smart home appliance. According to aspects of the disclosure, the electronic device may include a smart home appliance. The smart home appliance may include at least one of, for example, televisions, digital video disk (DVD) players, audios, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

Additionally or alternatively, the electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, and industrial or household robots.

Additionally or alternatively, the electronic device may include at least one of furniture or buildings/structures having internet function, electronic boards, electronic signature receiving devices, projectors, or various measuring instruments (for example, water, electricity, gas, or radio signal measuring instruments). The electronic device 1800 is not limited to any particular type of device.

Figure 19:
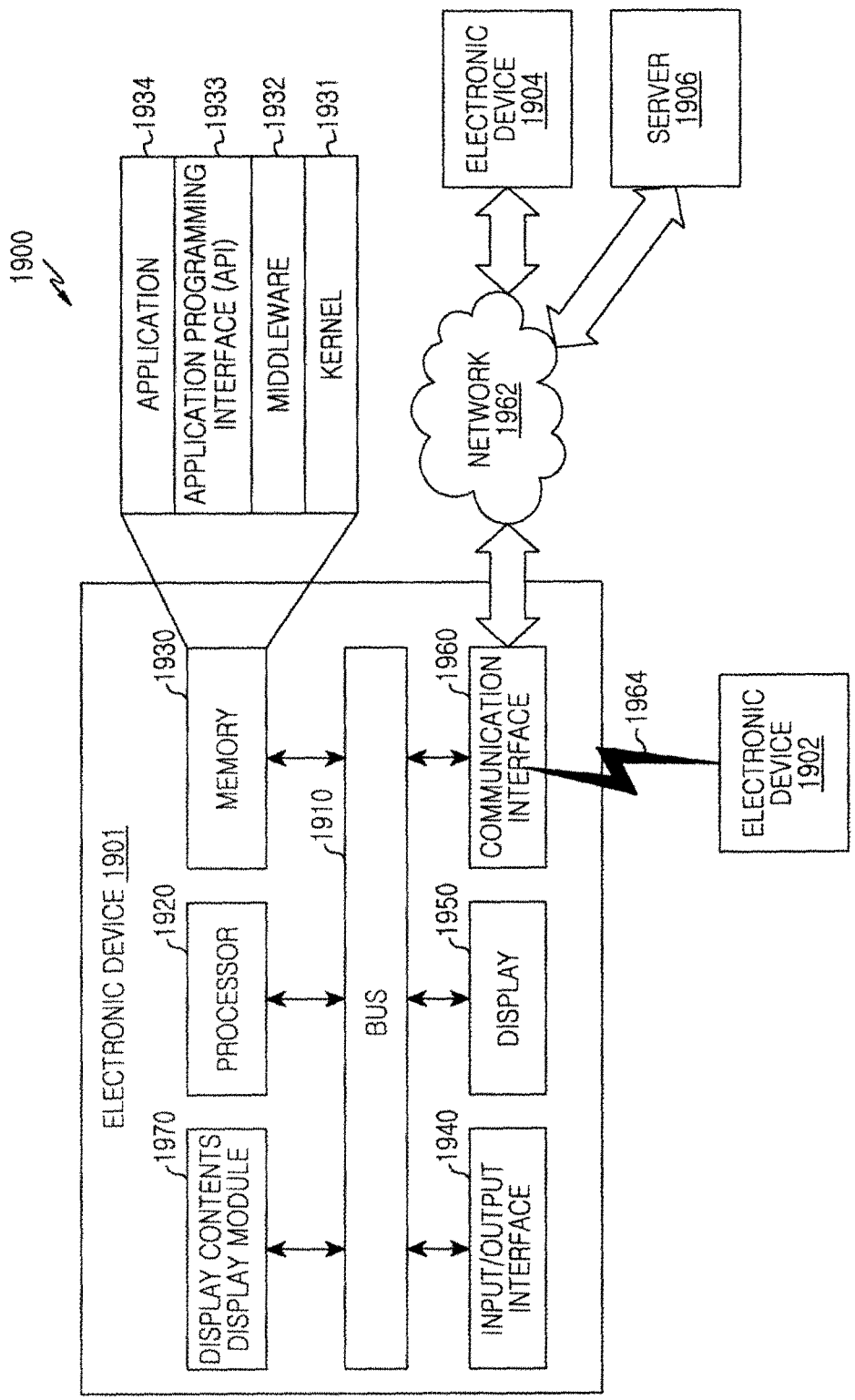
FIG. 19 is a diagram of an example of a system, according to aspects of the disclosure.

FIG. 19 is diagram of an example of a system 1900, according to aspects of the disclosure. Referring to FIG. 19, an electronic device 1901 may include a bus 1910, a processor 1920, a memory 1930, an input/output interface 1940, a display 1950, a communication interface 1960, and a digital contents display module 1970.

The bus 1910 may be a circuit connecting the above-mentioned components to each other and delivering a communication signal (for example, a control message) therebetween.

The processor 1920 may include any suitable type of processing circuitry, such as a general purpose processor (e.g., an ARM-based processor, a MIPS-based processor, an x86-based processor, etc.), an Application-Specific-Integrated Circuit (ASIC), and/or a Field-Programmable Gate Array (FPGA). The processor 1920, for example, receives an instruction from the above other components (for example, the memory 1930, the input/output interface 1940, the display 1950, the communication interface 1960, or the digital contents display module 1970) through the bus 1910, interprets the received instruction, and performs operations and data processing in response to the interpreted instruction.

The memory 1930 may include any suitable type of volatile and non-volatile memory. The memory 1930 may store an instruction or data received from the processor 1920 or other components (for example, the input/output interface 1940, the display 1950, the communication interface 1960, or the digital contents display module 1970) or an instruction or data generated from the processor 1920 or other components. The memory 1930, for example, may include programming modules, for example, a kernel 1931, a middleware 1932, an application programming interface (API) 1933, and an application 1934. Each of the above-mentioned programming modules may be configured with software, firmware, hardware, or a combination thereof.

The kernel 1931 may control or manage system resources (for example, the bus 1910, the processor 1920, or the memory 1930) used for performing operation or functions implemented by the remaining other programming modules, for example, the middleware 1932, the API 1933, or the application 1934. Additionally, the kernel 1931 may provide an interface for accessing an individual component of the electronic device 1901 from the middleware 1932, the API 1933, or the application 1934 and controlling or managing the individual component.

The middleware 1932 may serve as an intermediary role for exchanging data between the API 1933 or the application 1934 and the kernel 1931 through communication. Additionally, in relation to job requests received from the applications 1932, the middleware 1934 may perform a control (for example, scheduling or load balancing) for the job requests by using a method of assigning a priority for using a system resource (for example, the bus 1901, the processor 1910, or the memory 1920) of the electronic device 101 to at least one application among the applications 1934.

The API 1933, as an interface through which the application 1934 controls a function provided from the kernel 1931 or the middleware 1932, may include at least one interface or function (for example, an instruction) for file control, window control, image processing, or character control.

According to various aspects, the application 1934 may include an SMS/MMS application, an e-mail application, a calendar application, an alarm application, a health care application (for example, an application for measuring an exercise amount or blood sugar), or an environmental information application (for example, an application for providing pressure, moisture, or temperature information). Additionally or alternatively, the application 1934 may be an application relating to information exchange between the electronic device 1901 and an external electronic device (for example, the electronic device 1902 or the electronic device 1904). The application relating to information exchange, for example, may include a notification relay application for delivering specific information to the external electronic device or a device management application for managing the external electronic device.

For example, the notification relay application may have a function for delivering to an external electronic device (for example, the electronic device 1902 or the electronic device 1904) notification information occurring from another application (for example, an SMS/MMS application, an e-mail application, a health care application, or an environmental information application) of the electronic device 1901. Additionally or alternatively, the notification relay application 1134 may receive notification information from an external electronic device (for example, the electronic device 1902 or the electronic device 1904) and may then provide the received notification information to a user. The device management application, for example, may manage (for example, install, delete, or update) a function (for example, turning on/off an external electronic device itself (or some components) or adjusting the brightness (or resolution) of a display) for at least part of an external electronic device (for example, the electronic device 1902 or the electronic device 1904) communicating with the electronic device 1901, an application operating in the external electronic device, or a service (for example, a call service or a message service) provided from the external electronic device.

According to aspects of the disclosure, the application 1934 may include an application designated according to the attribute (for example, a type of an electronic device) of the external electronic device (for example, the electronic device 1902 or the electronic device 1904). For example, when an external electronic device is an MP3 player, the application 1934 may include an application relating to music playback. Similarly, when an external electronic device is a mobile medical device, the application 1934 may include an application relating to heath care. According to aspects of the disclosure, the application 1934 may include at least one of an application designated to the electronic device 1901 or an application received from an external electronic device (for example, the server 1906 or the electronic device 1902 or the electronic device 1904).

The input/output interface 1940 may deliver an instruction or data inputted from a user through a sensor (for example, an acceleration sensor or a gyro sensor) or an input device (for example, a keyboard or a touch screen), to the processor 1920, the memory 1930, the communication interface 1960, or the digital contents display module 1970 through the bus 1910. For example, the input/output interface 1940 may provide data on a user's touch inputted through a touch screen to the processor 1920. Additionally, the input/output interface 1940 may output an instruction or data received from the processor 1920, the memory 1930, the communication interface 1960, or the digital contents display module 1970 through the bus 1310, through the output device (for example, a speaker or a display). For example, the input/output interface 1940 may output voice data processed through the processor 1920 to a user through a speaker.

The display 1950 may display various information (for example, multimedia data or text data) to a user.

The communication interface 1960 may connect a communication between the electronic device 1901 and an external device (for example, the electronic device 1902 or the electronic device 1904 or the server 1904). For example, the communication interface 1960 may support a network communication 1962 (for example, Internet, local area network (LAN), wire area network (WAN), telecommunication network, cellular network, satellite network, or plain old telephone service (POTS)) and a short range communication 1964 (for example, wireless fidelity (Wi-Fi), Bluetooth (BT), near field communication (NFC) or a wired communication (for example, universal serial bus (USB), high definition multimedia interface (HDMI), recommended standard (RS)-232, or plain old telephone service (POTS)). According to aspects of the disclosure, a protocol (for example, a short range communication protocol, a network communication protocol, or a wired communication protocol) for communication between the electronic device 1901 and an external device may be supported by at least one of the API 1933 or the middleware 1932. Each of the electronic devices 1902 and 1904 may be identical to (for example, the same type) or different from (for example, a different type) the electronic device 1901.

The digital contents display module 1970 may process at least part of information obtained from other components (for example, the processor 1920, the memory 1930, the input/output interface 1940, or the communication interface 1360) and may output it to a user through various methods. For example, the digital contents display module 1970 may control at least part of functions of the electronic device 1901 to allow the electronic device 1901 to interoperate with another electronic device (for example, the electronic device 1902, the electronic device 1904, or the server 1906) by using the processor 1920 or separately (without using the processor 1920).

The digital contents display module 1970 may receive at least part of data (e.g., webpage source code) constituting a content item (e.g., a webpage), determine a layout level for the webpage, and configure the webpage in accordance with the layout level. The display module 1970 may execute (or otherwise implement) any one of the techniques and/or processes discussed with respect to FIGS. 1-18. The digital contents display module may be implemented using hardware (e.g., a processor any/or any other type of electronic circuit), software (e.g., one or more processor-executable instructions), and or a combination of hardware and software.

Figure 20:
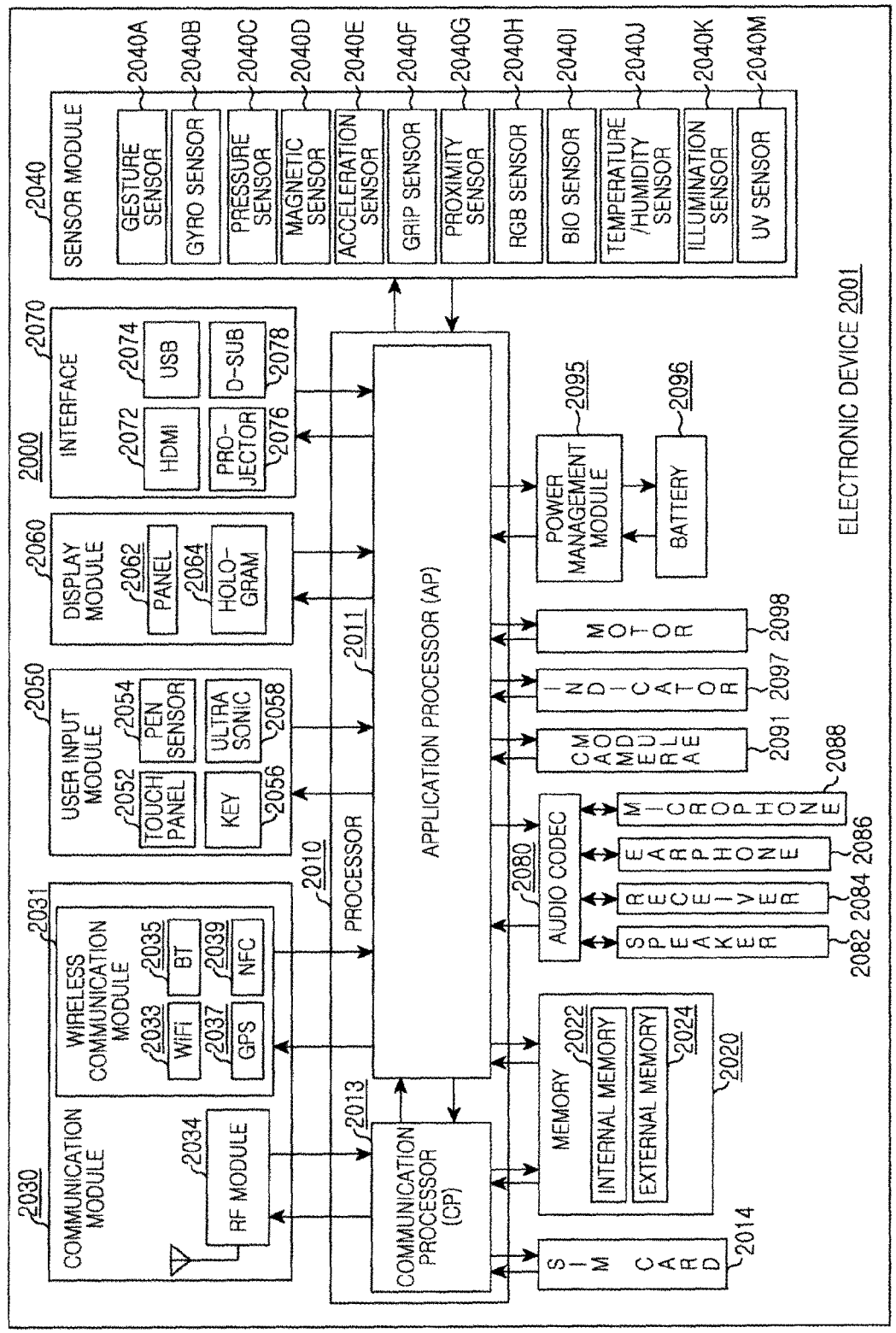
FIG. 20 is a diagram of an example of an electronic device, according to aspects of the disclosure.

FIG. 20 is a diagram 2000 of an example of an electronic device 2001, according to aspects of the disclosure. The electronic device 2001, for example, may configure all or part of the above-mentioned electronic device 1901 shown in FIG. 19. Referring to FIG. 20, the electronic device 2001 may include at least one processor 2010, a subscriber identification module (SIM) card 2014, a memory 2020, a communication module 2030, a sensor module 2040, an input module 2050, a display 2060, an interface 2070, an audio module 2080, a camera module 2091, a power management module 2095, a battery 2096, an indicator 2097, and a motor 2098.

The processor 2010 may include any suitable type of processing circuitry, such as a general purpose processor (e.g., an ARM-based processor, a MIPS-based processor, an x86-based processor, etc.), an Application-Specific-Integrated Circuit (ASIC), and/or a Field-Programmable Gate Array (FPGA). Additionally or alternatively, the processor 2010 (for example, the processor 2020) may include at least one application processor (AP) 2011 or at least one communication processor (CP) 2013. Although the AP 2011 and the CP 2013 included in the processor 2010 are shown in FIG. 20, they may be included in different IC packages. According to aspects of the disclosure, the AP 2011 and the CP 2013 may be included in one IC package.

The AP 2011 may control a plurality of hardware or software components connected to the AP 2011 and also may perform various data processing and operations with multimedia data by executing an operating system or an application program. The AP 2011 may be implemented with a system on chip (SoC), for example. According to aspects of the disclosure, the processor 2010 may further include a graphic processing unit (GPU) (not shown).

The CP 2013 may manage a data link in a communication between other electronic devices (for example, the electronic device 2002, the electronic device 2004, or the server 2006) connected to the electronic device 2001 (for example, the electronic device 2001) via a network and may perform a function for converting a communication protocol. The CP 2013 may be implemented with a SoC, for example. According to aspects of the disclosure, the CP 2013 may perform at least part of a multimedia control function. The CP 2013 may perform a distinction and authentication of an electronic device in a communication network by using a subscriber identification module (for example, the SIM card 2014), for example. Additionally, the CP 2013 may provide services, for example, a voice call, a video call, a text message, or packet data, to a user.

Additionally, the CP 2013 may control the data transmission of the communication module 2030. As shown in FIG. 20, components such as the CP 2013, the power management module 2095, or the memory 2020 are separated from the AP 2011, but according to aspects of the disclosure, the AP 2011 may be implemented including some of the above-mentioned components (for example, the CP 2013).

According to aspects of the disclosure, the AP 2011 or the CP 2013 may load commands or data, which are received from a nonvolatile memory or at least one of other components connected thereto, into a volatile memory and may process them. Furthermore, the AP 2011 or the CP 2013 may store data received from or generated by at least one of other components in a nonvolatile memory.

The SIM card 2014 may be a card including a subscriber identification module and may be inserted into a slot formed at a specific position of an electronic device. The SIM card 2014 may include unique identification information (for example, an integrated circuit card identifier (ICCID)) or subscriber information (for example, an international mobile subscriber identity (IMSI)).

The memory 2020 (for example, the memory 2030) may include an internal memory 2022 or an external memory 2024. The internal memory 2022 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory) According to aspects of the disclosure, the internal memory 2022 may be a Solid State Drive (SSD). The external memory 2024 may further include flash drive, for example, compact flash (CF), secure digital (SD), micro secure digital (Micro-SD), mini secure digital (Mini-SD), extreme digital (xD), or memory stick. The external memory 2024 may be functionally connected to the electronic device 1901 through various interfaces. According to aspects of the disclosure, the electronic device 1901 may further include a storage device (or a storage medium) such as a hard drive.

The communication module 2030 (for example, the communication interface 1960) may include a wireless communication module 2031 or an RF module 2034. The wireless communication module 2031 may include a Wi-Fi 2033, Bluetooth (BT) 2035, a GPS 2037, or a near field communication (NFC) 2039. For example, the wireless communication module 2031 may provide a wireless communication function by using a wireless frequency. Additionally or alternatively, the wireless communication module 2031 may include a network interface (for example, a LAN card) or a modem for connecting the electronic device 2000 to a network (for example, Internet, local area network (LAN), wire area network (WAN), telecommunication network, cellular network, satellite network, or plain old telephone service (POTS)).

The RF module 2034 may be responsible for data transmission, for example, the transmission of an RF signal. Although not shown in the drawings, the RF module 2034 may include a transceiver, a power amp module (PAM), a frequency filter, or a low noise amplifier (LNA). Additionally, the RF module 2034 may further include components for transmitting/receiving electromagnetic waves on a free space in a wireless communication, for example, conductors or conducting wires.

The sensor module 2040 measures physical quantities or detects an operating state of the electronic device 2000, thereby converting the measured or detected information into electrical signals. The sensor module 2040 may include at least one of a gesture sensor 2040A, a gyro sensor 2040B, a pressure sensor 2040C, a magnetic sensor 2040D, an acceleration sensor 2040E, a grip sensor 2040F, a proximity sensor 2040G, a color sensor 2040H (for example, a red, green, blue (RGB) sensor), a bio sensor 2040I, a temperature/humidity sensor 2040J, an illumination sensor 2040K, and an ultra violet (UV) sensor 2040M. Additionally/alternately, the sensor module 2040 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 2040 may further include a control circuit for controlling at least one sensor therein.

The input module 2050 may include a touch panel 2052, a (digital) pen sensor 2054, a key 2056, or an ultrasonic input device 2058. The touch panel 2052 may recognize a touch input through at least one of capacitive, resistive, infrared, or ultrasonic methods, for example. Additionally, the touch panel 2052 may further include a control circuit. In the case of the capacitive method, both direct touch and proximity recognition are possible. The touch panel 2052 may further include a tactile layer. In this case, the touch panel 2052 may provide a tactile response to a user.

The (digital) pen sensor 2054 may be implemented through a method similar or identical to that of receiving a user's touch input or an additional sheet for recognition. The key 2056 may include a physical button, an optical key, a keypad, or a touch key, for example. The ultrasonic input device 2058, as a device checking data by detecting sound waves through a mike (for example, the mike 2088) in an electronic device, may provide wireless recognition through an input tool generating ultrasonic signals. According to aspects of the disclosure, the electronic device 2000 may receive a user input from an external device (for example, a network, a computer, or a server) connected to the electronic device 2000 through the communication module 2030.

The display 2060 (for example, the display 1950) may include a panel 2062, a hologram 2064, or a projector 2066. The panel 2062, for example, may include a liquid-crystal display (LCD) or an active-matrix organic light-emitting diode (AM-OLED). The panel 2062 may be implemented to be flexible, transparent, or wearable, for example. The panel 2062 and the touch panel 2052 may be configured with one module. The hologram 2064 may show three-dimensional images in the air by using the interference of light. The projector 2066 may display an image by projecting light on a screen. The screen, for example, may be placed inside or outside the electronic device 2000. According to aspects of the disclosure, the display 2060 may further include a control circuit for controlling the panel 2062, the hologram device 2064, or the projector 2066.

The interface 2070 may include a high-definition multimedia interface (HDMI) 2072, a universal serial bus (USB) 2074, an optical communication terminal 2076, or a D-sub-miniature (sub) 2078, for example. The interface 2070 may be included in the communication interface 1960 shown in FIG. 19, for example. Additionally/alternately, the interface 2070, for example, may include a mobile high-definition link (MHL), a secure Digital (SD)/multi-media card (MMC), or an infrared data association (IrDA) (not shown).

The audio module 2080 may convert sound and electrical signals in both directions. At least some components of the audio module 2080 may be included in the input/output interface 1940 shown in FIG. 19, for example. The audio module 2080 may process sound information inputted/outputted through a speaker 2082, a receiver 2084, an earphone 2086, or a mike 2088.

The camera module 2091, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 2095 may manage the power of the electronic device 2000. Although not shown in the drawings, the power management module 2095 may include a power management integrated circuit (PMIC), a charger integrated circuit (IC), or a battery or fuel gauge, for example.

The PMIC may be built in an IC or SoC semiconductor, for example. A charging method may be classified as a wired method and a wireless method. The charger IC may charge a battery and may prevent overvoltage or overcurrent flow from a charger. According to aspects of the disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 2096, or a voltage, current, or temperature of the battery 396 during charging. The battery 2096 may store or generate electricity and may supply power to the electronic device 2000 by using the stored or generated electricity. The battery 2096, for example, may include a rechargeable battery or a solar battery.

The indicator 2097 may display a specific state of the electronic device 2000 or part thereof (for example, the AP 811), for example, a booting state, a message state, or a charging state. The motor 2098 may convert electrical signals into mechanical vibration. Although not shown in the drawings, the electronic device 2000 may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of an electronic device may be configured with at least one component and the name of a corresponding component may vary according to the kind of an electronic device. An electronic device according to aspects of the disclosure may be configured including at least one of the above-mentioned components or additional other components. Additionally, some of components in an electronic device according to aspects of the disclosure are configured as one entity, so that functions of previous corresponding components are performed identically.

The term "module" used in this disclosure, for example, may mean a unit including a combination of at least one of hardware, software, and firmware. The term "module" and the term "unit", "logic", "logical block", "component", or "circuit" may be interchangeably used. "module" may be a minimum unit or part of an integrally configured component. "module" may be a minimum unit performing at least one function or part thereof. "module" may be implemented mechanically or electronically. For example, "module" according to aspects of the disclosure may include any suitable type of processing circuitry, such as a processor, an application-specific integrated circuit (ASIC) chip performing certain operations, field-programmable gate arrays (FPGAs), or a programmable-logic device, all of which are known or to be developed in the future.

According to various aspects, at least part of a device (for example, modules or functions thereof) or a method (for example, operations) according to this disclosure, for example, as in a form of a programming module, may be implemented using an instruction stored in computer-readable storage media. When at least one processor (for example, the processor 210) executes an instruction, it may perform a function corresponding to the instruction. The computer-readable storage media may include the memory 220, for example. At least part of a programming module may be implemented (for example, executed) by processor 210, for example. At least part of a programming module may include a module, a program, a routine, sets of instructions, or a process to perform at least one function, for example.

FIGS. 1-20 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method comprising:
retrieving, by an electronic device, a markup language file associated with a document, the markup language file including an identifier for retrieving a content item that is part of the document;
parsing the markup language file into a first plurality of objects, the first plurality of objects including a first object associated with the content item, and each one of the first plurality of objects corresponds to a specific type in a plurality of types having at least two of a text type, an image type, a script type, a flash object type, and an iframe type;
assigning a respective layout level from a plurality of layout levels in a document object model (DOM) tree to each one of the first plurality of objects according to the type of each one of the first plurality of objects, wherein each different type, in the plurality of types associated with the first plurality of objects, uniquely corresponds to a different layout level in the plurality of layout;
detecting a first input in an area of a display unit of the electronic device where the document is output at an initial layout level and displaying a user interface element for changing the initial layout level of the document to a first layout level in the plurality of layout levels;
detecting a second input to the user interface element, wherein the second input selects the first layout level;
outputting the document in accordance with the first layout level by (i) retrieving the content item from a remote source in response to the layout level of the first object matching the first layout level, and (ii) rendering one or more objects from the first plurality of objects based on the one or more objects' respective layout levels matching the first layout level,
wherein objects assigned to each layout level in the plurality of layout levels also have sizes within an object size range uniquely required by each layout level in the plurality of layout levels.

2. The method of claim 1, wherein the markup language file includes a Hyper-Text Markup Language (HTML) file and the document includes a webpage.

3. The method of claim 1, wherein the markup language file includes a plurality of tags, and each one of the first plurality of objects is associated with a different tag.

4. The method of claim 1, wherein the content item includes at least one of an image or a script.

5. The method of claim 1, wherein rendering one or more objects from the first plurality of objects based on the one or more objects' respective layout levels matching the first layout level includes rendering objects from the first plurality of objects whose respective layout levels are lower than or equal to the first layout level.

6. The method of claim 1, further comprising:
detecting a third input; and
in response to the third input, retrieving the content item from the remote source, and outputting the document in accordance with a second layout level, wherein the outputting of the document in accordance with the second layout level includes rendering objects from the first plurality of objects whose respective layout levels match the second layout level.

7. The method of claim 1, wherein assigning the respective layout level from a plurality of layout levels to each of the plurality of objects includes generating a first tree comprising a second plurality of nodes, each of the second plurality of nodes being associated with a different one of the first plurality of objects and including an indication of the respective layout level of the different one of the first plurality of objects.

8. The method of claim 7, wherein the rendering includes generating a second tree based on the first tree, the second tree including only those nodes from the second plurality whose layout level matches the first layout level.

9. The method of claim 1, wherein the first layout level is selected automatically by the electronic device based on a current location of the electronic device.

10. An electronic device comprising a processor configured to:

retrieve a markup language file associated with a document, the markup language document including an identifier for retrieving a content item that is part of the document;

parse the markup language file into a first plurality of objects, the first plurality of objects including a first object associated with the content item, and each one of the first plurality of objects corresponds to a specific type in a plurality of types having at least two of a text type, an image type, a script type, a flash object type, and an iframe type;

assign a respective layout level from a plurality of layout levels in a document object model (DOM) tree to each one of the first plurality of objects according to the type of each one of the first plurality of objects, wherein each different type, in the plurality of types associated with the first plurality of objects, in the plurality of types uniquely corresponds to a different layout level in the plurality of layout levels;

detect a first input in an area of a display unit of the electronic device where the document is output at an initial layout level and display a user interface element for changing the initial layout level of the document to a first layout level in the plurality of layout levels;

detect a second input to the user interface element, wherein the second input selects the first layout level; and output the document in accordance with the first layout level by: (i) retrieving the content item from a remote source in response to the layout level of the first object matching the first layout level, and (ii) rendering one or more objects from the first plurality of objects based on the one or more objects' respective layout levels matching the first layout level, wherein objects assigned to each layout level in the plurality of layout levels also have sizes within an object size range uniquely required by each layout level in the plurality of layout levels.

11. The electronic device of claim 10, wherein the markup language file includes a Hyper-Text Markup Language (HTML) file and the document includes a webpage.

12. The electronic device of claim 10, wherein the markup language file includes a plurality of tags, and each one of the first plurality of objects is associated with a different tag.

13. The electronic device of claim 10, wherein the content item includes at least one of an image or a script.

14. The electronic device of claim 10, wherein to render the one or more objects from the first plurality of objects based on the one or more objects' respective layout levels matching the first layout level, the processor is further configured to render objects from the first plurality of objects whose respective layout levels are lower than or equal to the first layout level.

15. The electronic device of claim 10, wherein the processor is further configured to:
detect a third input; and
in response to the third input, retrieve the content item from the remote source, and output the document in accordance with a second layout level, wherein to output the document in accordance with the second layout level, the processor is further configured to render objects from the first plurality of objects whose respective layout levels match the second layout level.

16. The electronic device of claim 10, wherein to assign the respective layout level from the plurality of layout levels to each of the plurality of objects, the processor is further configured to generate a first tree comprising a second plurality of nodes, each of the second plurality of nodes being associated with a different one of the first plurality of objects and including an indication of the respective layout level of the different one of the first plurality of objects.

17. The electronic device of claim 16, wherein to render the one or more objects from the first plurality of objects based on the one or more objects' respective layout levels matching the first layout level, the processor is further configured to generate a second tree based on the first tree, the second tree including only those nodes from the second plurality whose layout level matches the first layout level.

18. The electronic device of claim 10, wherein the first layout level is selected automatically by the electronic device based on a current location of the electronic device.

* * * * *